(12) United States Patent
Higgins et al.

(10) Patent No.: US 10,901,967 B2
(45) Date of Patent: Jan. 26, 2021

(54) LICENSE PLATE MATCHING SYSTEMS AND METHODS

(71) Applicant: VERITOLL, LLC, Walnut, CA (US)

(72) Inventors: Christopher T. Higgins, Placentia, CA (US); Joseph C. Silva, Walnut, CA (US)

(73) Assignee: VERITOLL, LLC, Walnut, CA (US)

( * ) Notice: Subject to any disclaimer, the term of this patent is extended or adjusted under 35 U.S.C. 154(b) by 172 days.

(21) Appl. No.: 15/094,167

(22) Filed: Apr. 8, 2016

(65) Prior Publication Data

US 2016/0299897 A1    Oct. 13, 2016

Related U.S. Application Data

(60) Provisional application No. 62/236,266, filed on Oct. 2, 2015, provisional application No. 62/144,934, filed on Apr. 9, 2015.

(51) Int. Cl.
*G06F 16/22* (2019.01)
*G06F 16/248* (2019.01)
(Continued)

(52) U.S. Cl.
CPC ........ *G06F 16/2228* (2019.01); *G06F 16/248* (2019.01); *G06F 16/24578* (2019.01); *G06K 9/00785* (2013.01); *G06K 2209/15* (2013.01)

(58) Field of Classification Search
CPC .................................................. G06F 16/2228
See application file for complete search history.

(56) References Cited

U.S. PATENT DOCUMENTS 7,786,897 B2    8/2010  Alves
8,781,169 B2    7/2014  Jackson et al.
(Continued)

FOREIGN PATENT DOCUMENTS

CN    1152154 A    6/1997
CN    1413861 A    4/2003
(Continued)

OTHER PUBLICATIONS

International Search Report and Written Opinion from PCT/US2016/026652 dated Jul. 28, 2016.
(Continued)

*Primary Examiner* — Van H Oberly
(74) *Attorney, Agent, or Firm* — Lando & Anastasi, LLP

(57) ABSTRACT

Systems and methods for license plate matching. In one example, a system for license plate matching includes an interface configured to receive roadside data, the roadside data including a roadside image of a vehicle license plate, a database having a plurality of indexed entries, each entry including vehicle license plate fingerprint data and vehicle characteristic metadata, and a processor connected to a memory, the interface, and the database, the processor configured to execute a query against the database based on the roadside data, compare a portion of the entries to the roadside data, the processor being further configured to compare the roadside image of the vehicle license plate and the corresponding vehicle license plate fingerprint data when comparing the portion of the entries and roadside data, and generate a confidence based on a similarity between at least one individual entry of the portion of entries and the roadside data.

20 Claims, 13 Drawing Sheets

(51) Int. Cl.
*G06F 16/2457* (2019.01)
*G06K 9/00* (2006.01)

(56) References Cited

U.S. PATENT DOCUMENTS

| | | | |
|---|---|---|---|
| 2005/0084134 A1 | 4/2005 | Toda | |
| 2006/0278705 A1* | 12/2006 | Hedley | G07B 15/063 235/384 |
| 2009/0202105 A1* | 8/2009 | Castro Abrantes | G07B 15/06 382/100 |
| 2010/0054539 A1 | 3/2010 | Challa | |
| 2013/0129152 A1 | 5/2013 | Rodrigues Serrano et al. | |
| 2013/0182910 A1 | 7/2013 | Burry et al. | |
| 2014/0169674 A1 | 6/2014 | Vaya | |
| 2014/0195138 A1* | 7/2014 | Stelzig | G08G 1/0133 701/119 |
| 2014/0266984 A1 | 9/2014 | Sharma | |
| 2015/0077548 A1 | 3/2015 | Meredith et al. | |
| 2016/0253504 A1 | 9/2016 | Chen et al. | |
| 2016/0300119 A1 | 10/2016 | Silva et al. | |
| 2017/0109349 A1* | 4/2017 | Rosen | G06F 16/907 |
| 2017/0109600 A1* | 4/2017 | Voloshynovskiy | G06K 9/00577 |

FOREIGN PATENT DOCUMENTS

| | | |
|---|---|---|
| CN | 2757236 Y | 2/2006 |
| CN | 2826560 Y | 10/2006 |
| CN | 201130382 Y | 10/2008 |
| CN | 101770657 A | 7/2010 |
| CN | 101383003 B | 9/2010 |
| CN | 202453965 U | 9/2012 |
| CN | 202939661 U | 5/2013 |
| CN | 202956801 U | 5/2013 |
| CN | 203025786 U | 6/2013 |
| CN | 203025952 U | 6/2013 |
| CN | 103854487 A | 6/2014 |
| CN | 104463988 A | 3/2015 |
| EP | 1085456 A2 | 3/2001 |
| EP | 2320384 A1 | 5/2011 |
| EP | 2088568 A3 | 3/2013 |

OTHER PUBLICATIONS

Narula, P. et al. "MobileWorks: A Mobile Crowdsourcing Platform for Workers at the Bottom of the Pyramid", Human Computation, 2011.

Kumar et al., "Wallah: Design and Evaluation of a Task-centric Mobile-based Crowdsourcing Platform", Proceedings of the 11th International Conference on Mobile and Ubiquitous Systems: Computing, Networking and Services. ICST (Institute for Computer Sciences, Social-Informatics and Telecommunications Engineering), pp. 188-197, 2014.

Von Ahn et al., "reCAPTCHA: Human-Based Character Recognition via Web Security Measures", Science, vol. 321, No. 5895 (2008) pp. 1465-1468.

* cited by examiner

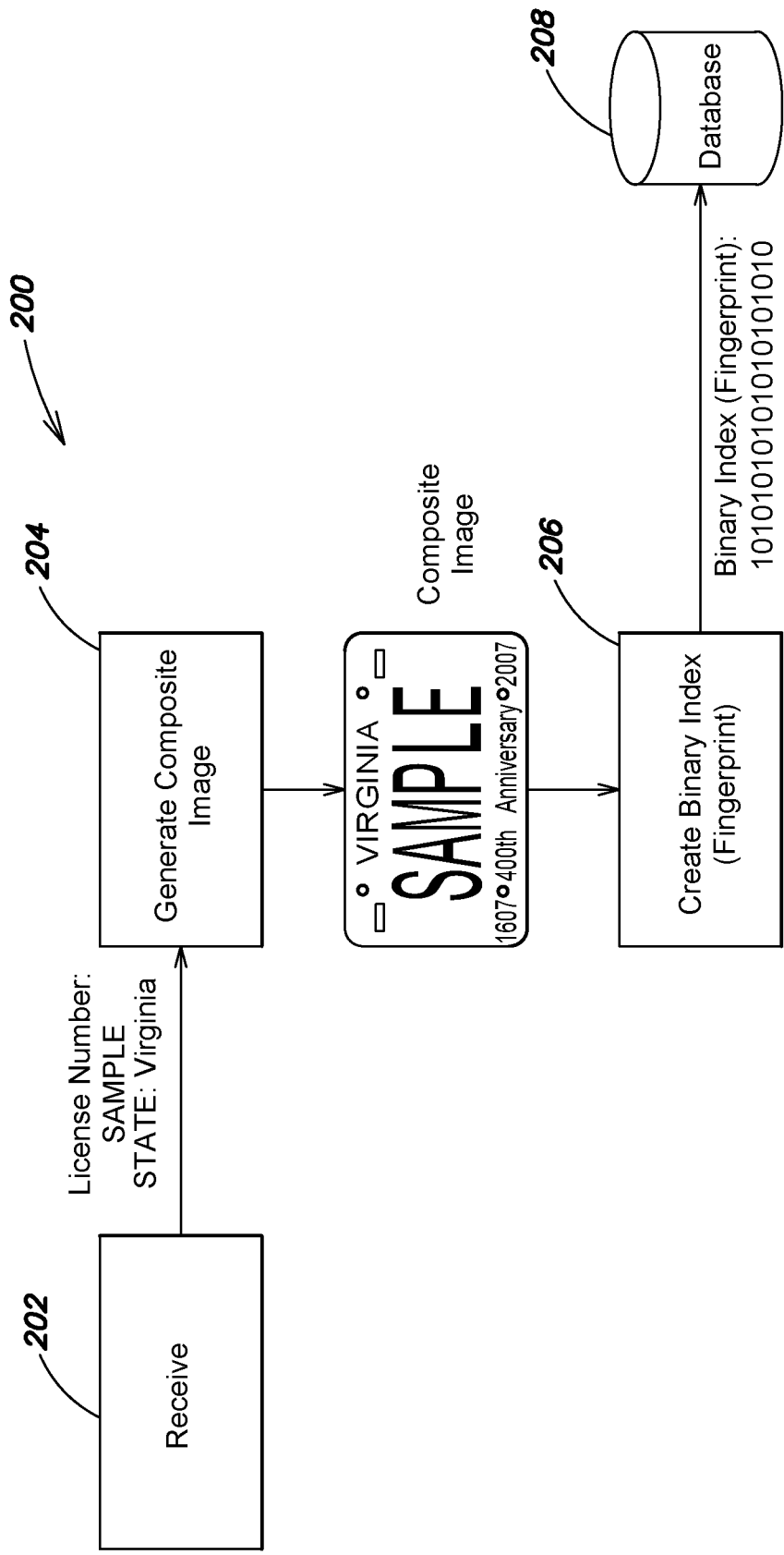

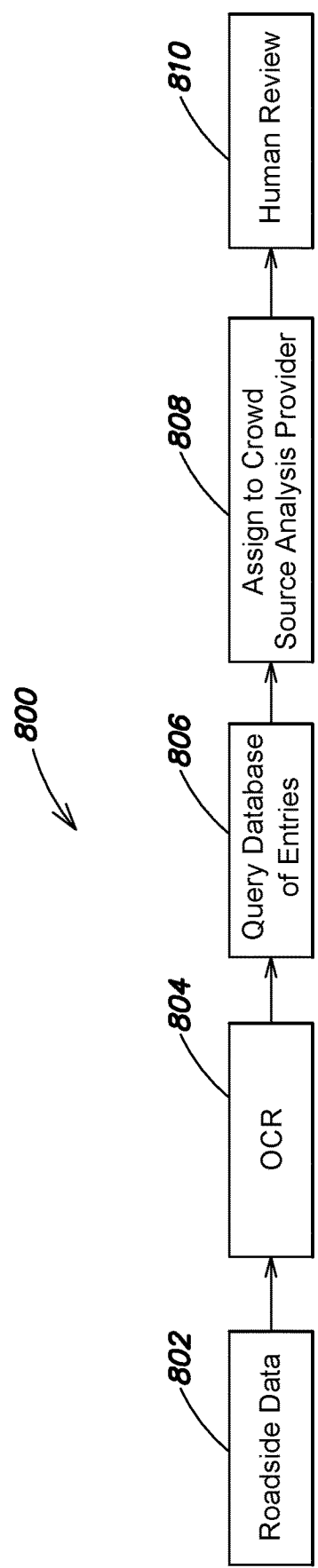

LICENSE PLATE MATCHING SYSTEMS AND METHODS

CROSS-REFERENCE TO RELATED APPLICATIONS

This application claims priority under 35 U.S.C. § 119(e) to U.S. Provisional Application Ser. No. 62/144,934, titled "LICENSE PLATE MATCHING SYSTEM AND METHOD," filed on Apr. 9, 2015, which is hereby incorporated herein by reference in its entirety, and U.S. Provisional Application Ser. No. 62/236,266, titled "LICENSE PLATE MATCHING SYSTEM AND METHOD," filed on Oct. 2, 2015, which is hereby incorporated herein by reference in its entirety.

BACKGROUND

License plate matching has become an increasingly popular method of regulating the ingress and egress of parking garages, toll roads, and private property. In various license plate matching systems, a video camera located near an entry point of the parking garage, toll road, or private property enables an operator to obtain and review license plate images of passing vehicles. The license plate images may be used to ascertain information regarding the vehicle, the driver of the vehicle, or the owner of the vehicle. Such imaging techniques also may also be found in numerous roadside enforcement systems, such as traffic light infraction systems.

Few reliable approaches exist for automatically reviewing license plate images and accurately recognizing characters and characteristics within those images. One approach includes Optical Character Recognition (OCR) during which alphanumeric characters from the image of the license plate are extracted based on their similarity to an abstract vector-like representation of a known letter or number. While frequently used, OCR processes have unpredictable accuracy and suffer significant performance inefficiencies when the obtained image is of low quality.

Accordingly, many OCR processes are combined with extensive image processing algorithms to force a higher quality image input or to compensate for errors in the extracted characters. Even with such corrective processes, often OCR-based systems require human review to ensure that extracted characters are being recognized properly. For example, in a variety of systems, such as traffic enforcement systems, automotive tolling systems, passive monitoring and data collection systems, and security monitoring systems, images that fall below a "confidence threshold" of the OCR process are designated for human review. Often this can include more than half of the images received.

SUMMARY OF THE INVENTION

Aspects and embodiments are directed to systems for license plate matching, and methods of using the same. Certain examples use roadside images of a vehicle license plate, as well as other characteristics associated with the vehicle, to match the vehicle's license plate to a known license plate. In a particular example, comparison of a roadside image of a vehicle license plate to one or more stored database entries of vehicle license plate fingerprint data allows accurate recognition of alphanumeric characters within the license plate of the roadside image at a high level of confidence. In certain examples, the system may also partition and assign one or more segments of the roadside image for distributed analysis and license plate matching among one or more crowd source analysis provider. Parallel processing among crowd source analysis providers augments the executional efficiency of the license plate matching system itself by fundamentally improving the functioning of the license plate matching system (i.e., the speed and the accuracy). Accordingly, various aspects and embodiments provide a more accurate and more efficient license plate matching system, compared to conventional OCR-based techniques.

According to an aspect, provided is a system for license plate matching. In one example, the system includes a system interface configured to receive roadside data from a remote device, the roadside data including at least a roadside image of a first vehicle license plate, a database having a plurality of indexed entries, each entry of the plurality of entries including at least vehicle license plate fingerprint data and vehicle characteristic metadata, and at least one processor operatively connected to a memory, the system interface, and the database, the processor when executing configured to execute a query against the database based on the roadside data, compare at least a portion of the entries to the roadside data, the processor when executing being further configured to compare the roadside image of the first vehicle license plate and at least the corresponding vehicle license plate fingerprint data when comparing the portion of the entries and the roadside data, and generate a confidence factor based in part on a degree of similarity between at least one individual entry of the portion of the entries and the roadside data.

In an example, the vehicle license plate fingerprint data includes image data extracted from a dynamically generated composite image of a virtual vehicle license plate. According to an example, the virtual vehicle license plate includes at least a predetermined series of characters. In one example, the first vehicle license plate includes at least a first series of characters, and in comparing the roadside image of the first vehicle license plate and the vehicle license plate fingerprint data, the processor when executing is further configured to compare the vehicle license plate fingerprint data and the roadside image of the first vehicle license plate so as to recognize at least one of the first series of characters. In an example, the first series of characters includes a vehicle registration identifier.

According to an example, the roadside data further includes roadside vehicle characteristic metadata, and in comparing the portion of the entries to the roadside data, the processor when executing is further configured to compare the roadside vehicle characteristic metadata and at least the corresponding vehicle characteristic metadata of the portion of the entries. In one example, the vehicle characteristic metadata includes at least one of speed, color, size, classification, age, tire noise, metal content, axes count, tire count, aerodynamic characteristics, engine noise, vehicle noise, and spatial contours.

In one example, the processor when executing is further configured to compare the confidence factor to a confidence threshold. According to an example, in response to a determination that the confidence factor is greater than the confidence threshold, the processor when executing is further configured to generate a new indexed entry based at least in part on the roadside data.

In an example, the system interface is further configured to receive the roadside data from a user device. According to an example, the database includes one or more cloud database instances provisioned among one or more cloud database providers. In an example, the vehicle license fingerprint data of each entry includes at least one binary index.

According to an aspect, provided is method for license plate matching. In one example, the method includes receiving roadside data including at least a roadside image of a first vehicle license plate, querying a database having a plurality of indexed entries, each entry of the plurality of entries within the database including at least vehicle license plate fingerprint data and vehicle characteristic metadata, comparing at least a portion of the entries to the roadside data, including comparing the roadside image of the first vehicle license plate and at least the corresponding vehicle license plate fingerprint data, and generating a confidence factor based in part on a level of similarity between at least one individual entry of the portion of the entries and the roadside data.

According to an example, the method further includes dynamically generating a composite image of a virtual vehicle license plate, and the vehicle license plate fingerprint data of at least one entry includes image data extracted from the composite image. In an example, comparing the roadside image of the first vehicle license plate and the vehicle license plate fingerprint data further includes comparing the vehicle license plate fingerprint data and the roadside image of the first vehicle license plate so as to recognize at least one of a first series of characters of the first vehicle license plate.

In an example, comparing the portion of the entries to the roadside data includes comparing the roadside vehicle characteristic metadata and at least the corresponding vehicle characteristic metadata. In on example, the method further includes comparing the confidence factor to a confidence threshold. According to an example, the method further includes generating a new entry based at least in part on the roadside data and responsive to determining that the confidence factor is greater than the confidence threshold. In one example, querying the database further includes querying one or more cloud compute database instances provisioned among one or more cloud database providers.

According to an aspect, provided is a method for vehicle license plate indexing. In one example, the method includes receiving vehicle license plate metadata, dynamically generating a composite image of a virtual vehicle license plate based on the received vehicle license plate metadata, generating vehicle license plate fingerprint data, the vehicle license plate fingerprint data including image data extracted from the composite image, and generating an indexed entry for a vehicle license plate matching system database based at least in part on the vehicle license plate fingerprint data.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 2 is an example process flow for generating database entries according to various aspects of the present invention;

FIG. 8 is an example process flow for license plate matching according to various aspects of the present invention.

DETAILED DESCRIPTION

Figure 1:
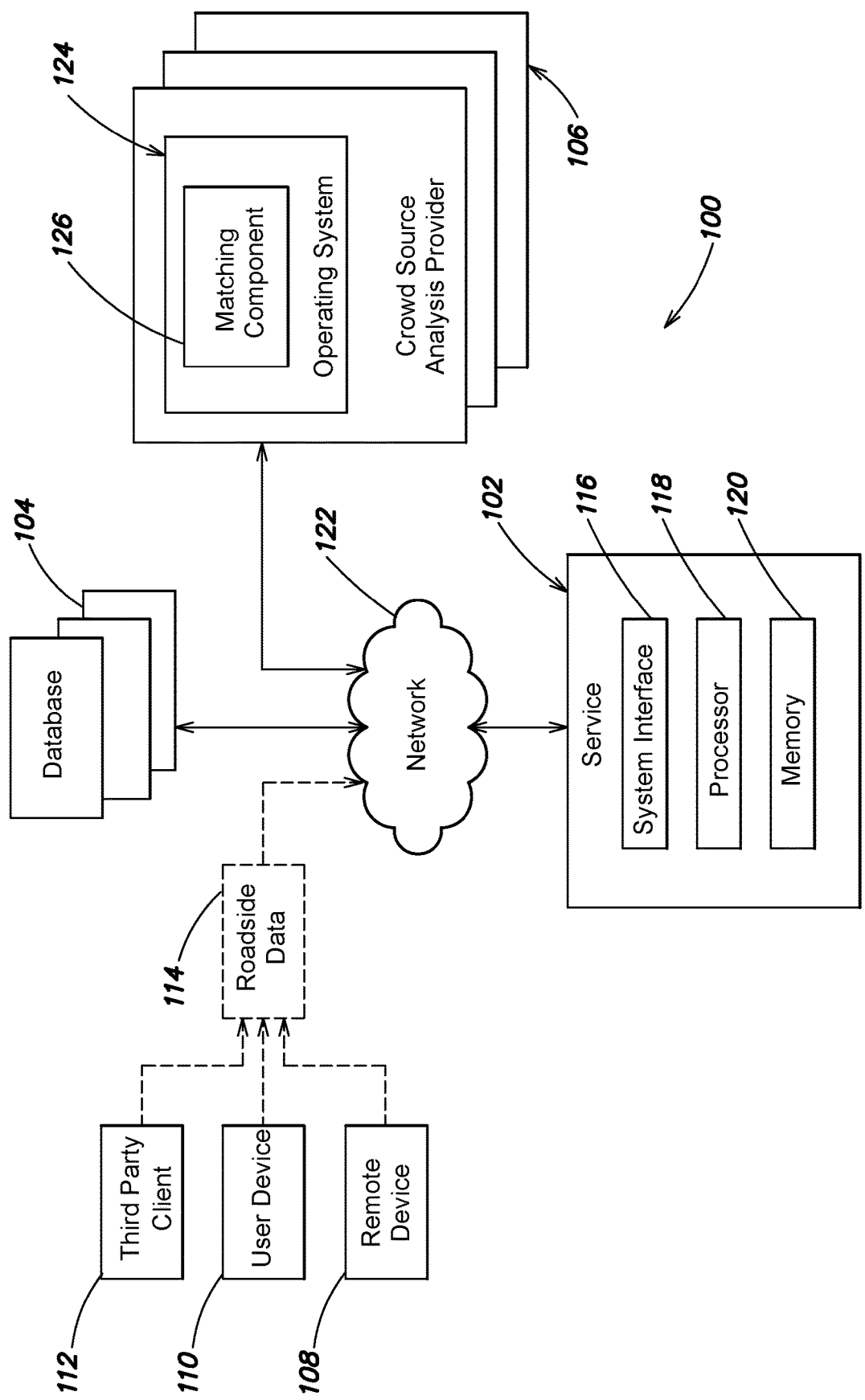
FIG. 1 is a block diagram of an example license plate matching system according to various aspects of the present invention.

Aspects and embodiments are directed to systems for license plate matching, and methods of using the same. Certain examples use roadside images of a vehicle license plate, as well as other characteristics associated with a corresponding vehicle, to match the vehicle's license plate to a known vehicle license plate. In a particular example, comparison of a roadside image of a vehicle license plate to one or more stored database entries of vehicle license plate "fingerprint" data allows accurate recognition of alphanumeric characters within the license plate of the roadside image at a high level of confidence. In certain examples, the system may also be configured to partition and assign one or more segments of the roadside image for distributed analysis and parallel processing at one or more crowd source analysis provider. Accordingly, various aspects and embodiments provide a more accurate and more efficient license plate matching system, compared to conventional OCR techniques.

As discussed above, OCR processes alone have proved largely inadequate for license plate matching. To compensate for the deficiencies in standalone OCR technology, many conventional matching systems combine OCR processes with extensive image processing algorithms to improve the quality of the received image. Other techniques for improving the reliability of OCR processes require standardized character shapes, fonts, and spacing, or customized templates. Such techniques are generally impractical for license plate matching due to the high level of regulation of vehicle license plate fonts, sizes, colors, etc. Despite efforts to improve the accuracy of OCR processes, many imaging systems invariably rely on human review for the best accuracy. For example, in a variety of applications, such as detection of traffic infractions, automotive tolling, and security monitoring, images that fall below a "confidence threshold" of the OCR process are designated for human review. Understandably, human review is time-consuming, inefficient, and costly.

Accordingly, various aspects and embodiments discussed herein provide an improved license plate matching system that allows accurate recognition of license plate characters without primary reliance on traditional human-review procedures. Particular embodiments augment the executional efficiency of the license plate matching system itself by fundamentally improving the functioning of the license plate matching system (i.e., the speed and the accuracy). For example, binary image comparison of a roadside image of a vehicle license plate and one or more stored database entries of vehicle license plate fingerprint data allows accurate recognition of alphanumeric characters within the license plate at a high level of confidence. Dynamic integrations of constantly received roadside data, enables the continuous generation of new database entries, and the constant access to updated information. As such, various embodiments avoid the time-consuming, inefficiency, and costly implementation of traditional human review processes.

It is to be appreciated that embodiments of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Example License Plate Matching System

FIG. 1 shows a block diagram of a license plate matching system 100 and service suitable for incorporation of various aspects of the present disclosure. As shown, the system 100 may include an indexed database 104, one or more crowd source analysis provider 106, a license plate matching service 102, and one or more sources of roadside data 114, such as a remote device 108, a user device 110, and a third party client 112. In various examples, the service 102 receives the roadside data 114 at a system interface 116 via a network connection 122 with one or more of the sources of the roadside data 114. For instance, the roadside data 114 may include a roadside image of a vehicle license plate and/or roadside vehicle characteristic metadata.

In various embodiments, the service 102 is configured to query the indexed database 104 based on the roadside data 114, and compare the roadside data 114 to one or more entries within the database 104 to recognize one or more of a series of characters of the license plate. That is, the service 102 may compare the roadside data 114 to one or more of the database 104 entries to match the vehicle license plate to a known license plate corresponding to a particular entry. As discussed in further detail below, in various embodiments the service 102 is also configured to partition the roadside data 114 into one or more segments for parallel processing among the plurality of crowd source analysis providers 106. Such aspects and embodiments offer a license plate matching system having improved speed and inefficiency when compared to conventional OCR techniques.

As discussed herein, "vehicle license plate" may refer to any vehicle registration plate or number plate used for identification purposes. Typically, vehicle license plates may include a series of alphanumeric or numeric characters (referred to generally as "characters" or "alphanumeric characters"), such as a vehicle registration identifier that uniquely identifies the vehicle, the operator of the vehicle, and/or the owner of the vehicle. Often the vehicle registration identifier corresponds to one or more data entries in a database of an issuing authority (e.g., a database of Motor Vehicle Agency). It is appreciated that in many instances, vehicle license plates will include identifying information in addition to the displayed vehicle registration identifier. For example, many license plates will display the issuing authority (e.g. a State, Province, or region) and a license plate type (e.g., automobile, motorcycle, trailer, commercial, etc.), among other information.

In various embodiments, the service 102 may include one or more components, each of which may be implemented on one or more computer systems. For instance, the system 100 may include a query component configured to query the indexed database 104, a comparison component configured to compare the roadside data 114 and one or more entries within the database 104, and a confidence factor component configured to generate a confidence factor based on the comparison(s). In further embodiments, the service 102 may include a partition component configured to partition the roadside data 114, and an assignment component configured to assign the one or more segments of the partitioned roadside data 114 to the one or more crowd source analysis providers 106. For instance, the license plate matching system 100 is shown as including the at least one system interface 116, the at least one processor 118, and the memory 120, configured to implement the service 102. However, in various arrangements, the service 102 may be implemented on a distributed computer system using one or more communication networks (i.e., the Internet). For example, the service 102 may include a webserver which is capable of serving as a front end to the service 102. In one implementation, the service 102 is implemented in a cloud-based computing platform, such as the well-known EC2 platform available commercially from Amazon.com, Seattle, Wash. Other implementations are possible and are within the scope and spirit of the invention, and it is appreciated that other platforms may be used.

The system interface 116 of the license plate matching system 100 is configured to receive the roadside data 114 from the one or more of the sources of roadside data 114. As shown, the sources of roadside data may include a remote device 108, a user device 110, and/or a third party client 112. In various embodiments the remote device 108 may include any device positioned to capture roadside vehicle license plate images or roadside vehicle characteristic metadata. For instance, the remote device 108 may include a device positioned to optically capture vehicle license plate images, such as cameras, video recorders, or other optic sensing devices. In certain embodiments, the remote device 108 may optically capture roadside vehicle characteristic metadata in addition to the roadside vehicle license plate images. Such roadside vehicle characteristic metadata may include, but is not limited to: color, size, classification, age, axes, tire count, aerodynamic characteristics, vehicle contours, vehicle loading, and vehicle occupancy, for example. In various other embodiments, the remote device 108 may include a device positioned to capture roadside vehicle characteristic metadata through methods other than optical imaging, such as audio recording, pressure sensing, or laser sensing. For instance, the remote device 108 may include an acoustic sensor (e.g., microphone) configured to measure: tire noise, engine noise, or vehicle noise, among other acoustic energy.

While in one embodiment, the source of roadside data 114 may include the remote device 108, in various other implementations, the system interface may receive the roadside data 114 from the user device 110. For example, the user device 110 may include a cell phone, smart phone, PDS, tablet computer, laptop, or other computing device. In at least one example, a roadside image of a vehicle license plate may include a photograph taken by a camera integral to a cell phone or smart phone. Similarly, the roadside data 114 may be received by the system interface 116 from a third party client 112, such as through an Application Programming Interface (API) that permits the exchange of roadside data 114 with a third party roadside data database. To name a few, third party clients 112 may include a Motor Vehicle Agency database (e.g., a DMV database), a third party driver's record database, a third party security system, and/or other publicly available vehicle license plate databases.

As shown, the system 100 may include at least one database 104 of indexed and stored entries. Each stored entry may include vehicle license plate fingerprint data and/or vehicle characteristic metadata. Within the database 104, entries may be stored in any suitable table, and may be indexed for improving the speed of read and write operations. In various embodiments, entries are stored as multiple binary indexes and may include additional fields that sum the binary index bits therein. Such an embodiment permits range-based searching and comparing. In particular, multiple fields within summed binary index bits may provide binned, indexed, and manageable searching, matching, and cross matching, among other operations. For instance, known individual characters and relative locations may help determine a subset of possible license plate matches. In certain embodiments, the database 104 may include a cloud database implemented by a cloud computing platform. For instance, the database 104 may include one or more cloud database instances provisioned among one or more cloud database providers. A cloud database service may control the underlying instances of the database, including an API that allows control regulation of the database instances.

Each entry within the database 104 may be individually retrievable to compare vehicle license plate fingerprint data and/or vehicle characteristic metadata associated therewith to the roadside data 114. In at least one example, the vehicle license fingerprint data includes image data extracted from a dynamically generated composite image of a virtual vehicle license plate, and the vehicle characteristic metadata includes information descriptive of a vehicle. Similar to an actual vehicle license plate, the composite image of the virtual vehicle license plate may include a series of characters (e.g., vehicle registration identifier), an issuing authority, and a license plate type. In various embodiments, the service 102 generates one or more entries within the database 104 by cycling through random license plate characters, issuing authorities, and license plate types to generate a robust repository of vehicle license plate fingerprint data. However, in various other embodiments, the service 102 generates one or more entries based on a predetermined set of license plate characters, issuing authorities, and license plate types. For example, entries may be generated based on patterns of license plate characters or plaintext characters received from an issuing authority database. In particular embodiments, the vehicle license plate fingerprint data of each entry within the database 104 may include a binary index, allowing for binary matching with the roadside data 114. While in one embodiment, vehicle license plate fingerprint data may include image data extracted from a composite image of a virtual vehicle license plate, in various implementations, the finger print data may include image data extracted from an actual image of a vehicle license plate, such as a photograph supplied from the user device 110.

Turning briefly to FIG. 2, there is illustrated one example of a process flow 200 for generating database entries. Vehicle license plate metadata which may be used by the service 102 to generate a database entry is received from one or more source (act 202). In various embodiments, the vehicle license plate metadata may be received from the same source as the roadside data 114, such as the user device 110 or the third party client 112. Vehicle license plate metadata may include actual images of a vehicle license plate, or any other information descriptive of a vehicle license plate. For instance, one or more plaintext registration numbers may be received from an issuing authority database, such as the DMV. In another example, vehicle license plate metadata may be received from a web-based application or a mobile application executing on a user device (e.g., user device 110). Other sources of vehicle license plate metadata may include a third party driver's record database, a third party security system, and/or other publicly available vehicle license plate databases. For example, in FIG. 2 vehicle license plate metadata including the plaintext alphanumeric characters "SAMPLE" and the issuing authority "Virginia" are received from a DMV database.

Responsive to receiving the vehicle license plate metadata, in various embodiments one or more components of the service 102, such as a composite image engine, generate the composite image of the virtual license plate (act 204). As shown, the composite image of the virtual license plate emulates an actual license plate image including that vehicle license plate metadata received from the source. In various embodiments, the received license plate metadata specifies the series of characters, issuing authority, and license plate type of the virtual vehicle license plate generated. It is appreciated that when the received vehicle license plate metadata includes an actual image of a vehicle license plate (e.g., a photograph from the user device 110), generation of a composite image may be redundant, and accordingly, the process 200 may skip directly from act 202 to act 206.

Once generated, image data may be extracted from the composite image to create vehicle license plate fingerprint data (act 206). In particular, the vehicle license plate fingerprint data may include one or more unique binary index for the composite image of the virtual vehicle license plate or the supplied actual image of the vehicle license plate. The vehicle license plate fingerprint data (e.g., binary indexes) may be stored in the database 104, as discussed above (act 208). Accordingly, each entry within the database 104 corresponds to known vehicle license plate. That is, each entry corresponds to a unique vehicle license plate having a known series of characters, known issuing authority, and known license plate type.

Returning to FIG. 1, the service 102 may also send and receive data with the one or more crowd source analysis providers 106. For example, the service 102 may partition the roadside data 114 into one or more segments and assign the one or more segments to a crowd source analysis 106 provider for distributed analysis. Specifically, the service 102 may partition the roadside image of the vehicle license plate into one or more segments, each segment having at least one character to be recognized (i.e., identified) by a crowd source analysis provider 106. In this manner, characters recognized by the one or more crowd source analysis providers 106 may be received and combined by the service 102 to reconstruct the series of characters of the vehicle license plate, and match that vehicle license plate to a known license plate. That is, the service 102 may divide character recognition of characters within the vehicle license plate of the roadside image into one or more tasks, each of which is solved by one or more of the crowd-source analysis providers 106. As discussed in further detail below with reference to at least FIGS. 3A and 3B, in various embodiments the same segment of a partitioned roadside image may be sent to multiple crowd source analysis providers 106 in parallel to improve the accuracy of recognized characters. Further, while discussed herein as partitioning the roadside image into one or more segments, in certain embodiments, the entire roadside image of the vehicle license plate may be provided to the one or more crowd source analysis provider 106.

In one example, the crowd source analysis providers 106 may include any number of outside contributors such as one or more networked computers that coordinate their actions by one or more messages with the service 102. For instance, in the shown example of FIG. 1, the crowd source analysis providers 106 are shown as including a plurality of user devices, each of the user devices having an operating system 124 executing a vehicle license plate matching application or vehicle license plate matching software component 126 within an application. In one embodiment, each of the user devices executes a reviewer interactive web-based application, a mobile-application, or other software component, that allows a reviewer (e.g., a user) to interact with the assigned segment and recognize one or more characters within that segment, and/or confirm or reject a previously matched license plate. As further discussed below, the software component 126 may implemented within a video game, a puzzle, or other form of visual amusement, or may be implemented as an automated test to tell humans and computing devices apart (e.g., a CAPTCHA). In particular, the software component may be included within a mobile application, such as a video game application downloaded or purchased from an application store. Accordingly, in various embodiments each crowd source analysis provider 106 may self-elect to receive one or more segments from the service 102. For example, a crowd source analysis provider may register with the service 102 responsive to downloading or purchasing a web-based application or a mobile application.

Figure 3A:
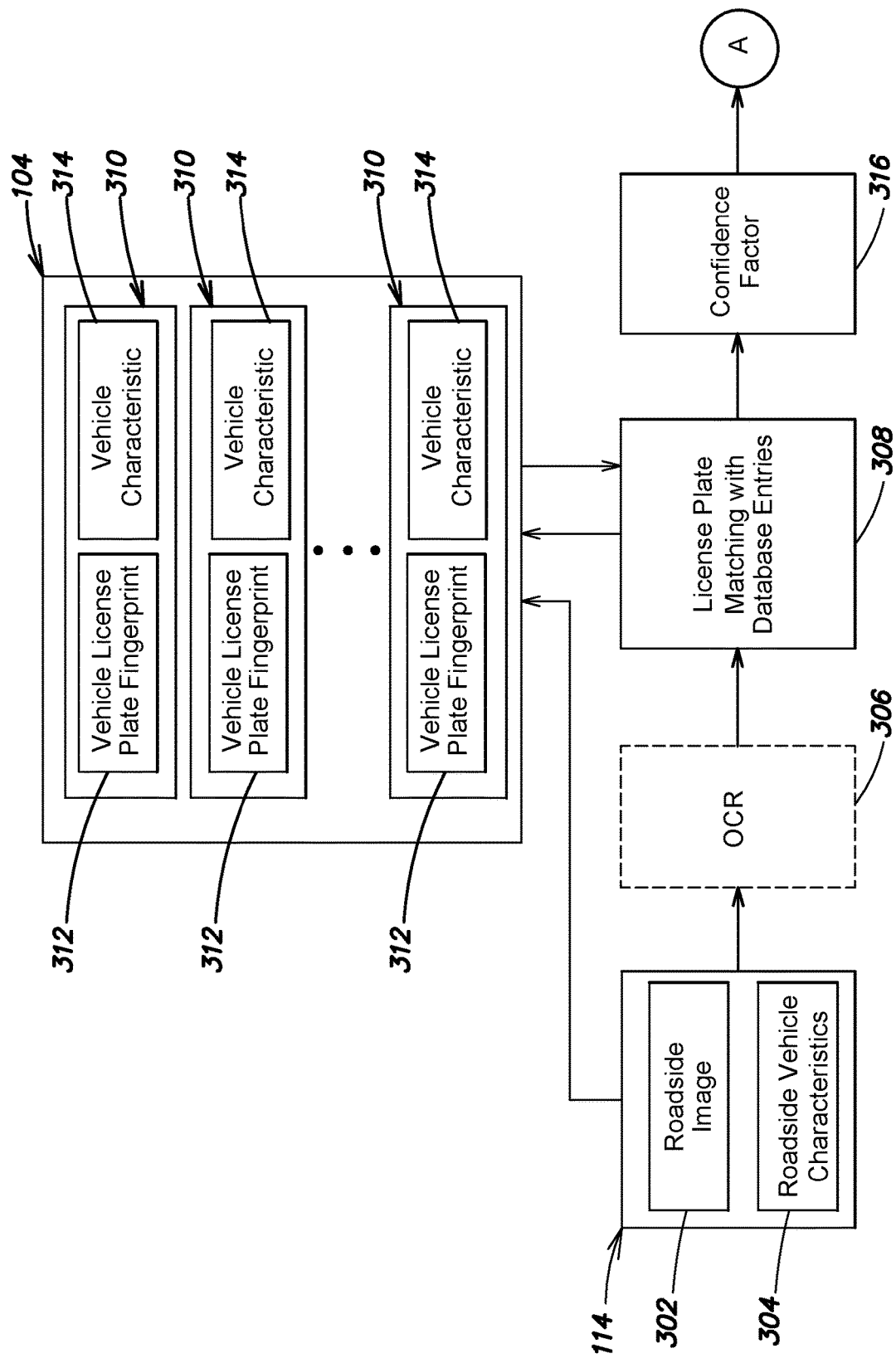
FIGS. 3A-3B are an example illustration of license plate matching as performed by the example license plate matching system shown in FIG. 1, according to various aspects of the present invention.
Figure 3B:
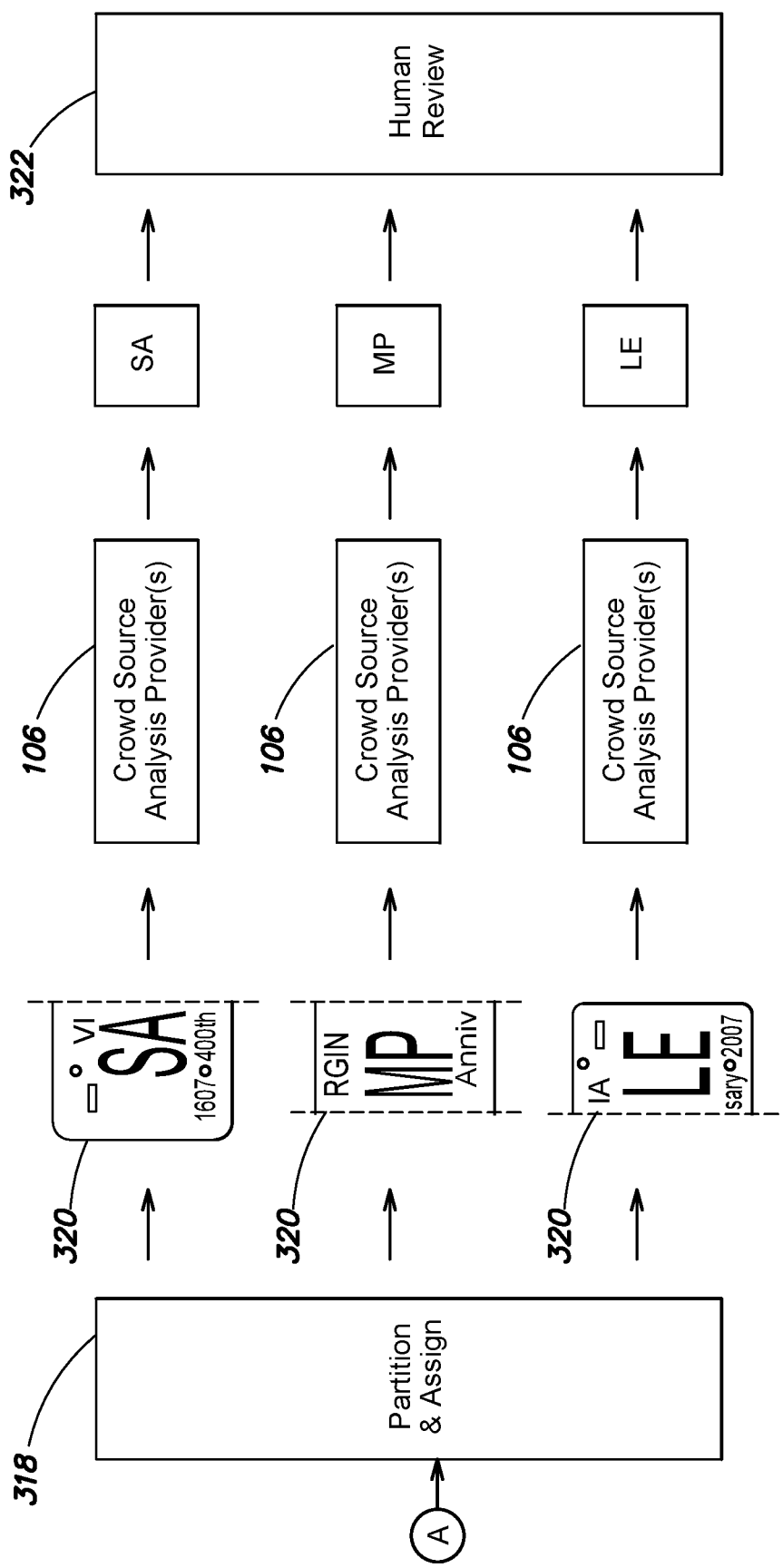

Turning now to FIGS. 3A-3B, FIGS. 3A-3B show one example of license plate matching as performed by the example system 100 shown in FIG. 1. FIGS. 3A-3B are described with continuing reference to FIG. 1. As discussed above, in various embodiments the roadside data 114 includes a roadside image of a vehicle license plate 302 and roadside vehicle characteristic metadata 304. Such roadside data 114 may be received in real-time immediately following generation of the roadside data 114, such as immediately after a roadside image is captured by the remote device 108. In other embodiments, the roadside data 114 may be received after aggregation of the roadside data 114 with other sets of roadside data. That is, while roadside data 114 may be received in individual sets of data in real-time, in various embodiments multiple license plates may be matched by the system in parallel, and accordingly, the system 100 may accommodate receiving large volumes of roadside data. In various examples, the roadside data 114 may be received via any suitable network connection such as an encrypted connection using Secure Sockets Layer (SSL) or any other suitable protocol.

In certain embodiments, the roadside data 114 received by the system interface 116 may be immediately indexed and stored at the database 104. For example, if the received roadside data 114 corresponds to a previously matched vehicle license plate, such data 114 may be used to generate a new database entry for future comparison. In various other implementations, responsive to receiving the roadside data 114, the service 102 may execute one or more Optical Character Recognition (OCR) algorithms 306. Specifically, the service 102 may implement an OCR algorithm 306 to determine the particular areas of the roadside image 302 that include the characters of the vehicle license plate. In various embodiments, the roadside image 302 may capture more information than just the vehicle license plate, and accordingly, the OCR processing by the service 102 may also allow the service 102 to "trim" the roadside image 302 to remove any unwanted information. In various other embodiments, areas of the roadside image 302 other than those corresponding to the vehicle license plate may be used to extract roadside vehicle characteristic metadata such as color, size, classification, age, metal content, axes count, aerodynamic characteristics, and contours, to name a few examples. In various embodiments the remote device 108 may include a corresponding infrared imaging OCR system, a visible light imaging OCR system, or any other suitable OCR imaging system in communication via the network 122 with the system interface 116.

In various embodiments, the service 102 may also execute the OCR algorithm 306 to analyze the roadside image 302 of the license plate to recognize one or more of the series of characters within the vehicle license plate of the roadside image 302. For example, the service 102 may detect characters within the roadside image 302 and compare each character to a stored glyph. While it is appreciated that some conventional OCR algorithms may be considerably inaccurate, in some instances, accurate results produced by the OCR algorithm 306 may nevertheless improve the performance of the license plate matching system 100. In such situations, the service 102 may query the database 104 and/or assign one or more segments of the roadside data 114 to a crowd source analysis provider 106 for verification of the OCR results. Further, accurate OCR results may be used to generate one or more new entries within the database 104. That is, in various embodiments, recognized characters of an imaged vehicle license plate may be used to generate new vehicle license plate finger print data and corresponding vehicle characteristic metadata. Responsive to recognizing one or more characters of the vehicle license plate of the roadside image 302, the service 102 may combine the recognized characters to match the corresponding license plate to a known license plate, and query a Motor Vehicle Agency database for driver or vehicle information corresponding to the matched license plate.

Responsive to the recognition of one or more characters within the roadside image 302, the service 102 may also generate a first confidence factor based at least in part on the similarity of the recognized character, and one or more of the stored glyphs. The first confidence factor represents the strength of the similarity between the recognized character and stored glyph, and in one example may be represented as a percentage. In various embodiments, the service 102 may compare the first confidence factor to a threshold to determine whether further analysis of the roadside data 114 is required. For example, if the service 102 determines that the first confidence factor has not met the confidence threshold, the service 102 may then query the indexed database 104 for further license plate matching. While discussed with reference to a single character of the vehicle license plate for the convenience of description, in various embodiments, the first confidence factor may refer to the entire series of recognized characters from the roadside image 114 of the license plate, such as a recognized vehicle registration identifier (e.g., license plate characters and numbers).

In various other embodiments, the service 102 may query the database (block 308) responsive to receiving the roadside data and omit the example OCR processes. That is, in various embodiments the service 102 may execute the OCR algorithm as an alternative to comparing roadside data 114 with one or more database entries 310. When querying the database 104, the roadside data 114 may be compared to individual entries 310 within the database 104 to match a vehicle license plate associated with the roadside data 114 with one or more vehicle license plates associated with a database entry 310. Specifically, the roadside image 302 of the vehicle license plate may be compared with the vehicle license plate fingerprint data 312 of each database entry 310, and/or the roadside vehicle characteristic metadata 304 may be compared with the vehicle characteristic metadata 314 of one or more database entry 310 alone or in combination. Based on each comparison, the service 102 may recognize one or more characters within the vehicle license plate of the roadside image 302, and match the vehicle license plate to a known license plate associated with a database entry 310. For instance, each character within the vehicle license plate of the roadside image 302 may be matched to a series of characters of a known license plate. In certain embodiments, the service 102 is configured to binary match each set of vehicle license plate fingerprint data to the roadside image 302 of the vehicle license plate.

Each database entry 310 may be dynamically generated by the service 102 responsive to receiving vehicle license plate metadata or responsive to receiving roadside data (e.g., roadside data 114). In one implementation, each database entry 310 includes a vehicle license plate profile descriptive of a particular vehicle associated with a known license plate. Individual binary indexes associated with entries allow a range of matching processes to be performed for a variety of vehicle characteristic metadata (e.g., metadata 314), as well as vehicle license plate fingerprint data 312. Specifically, ordered matching based on individual binary indexes optimizes efficiency by limiting the amount of comparisons between the set of roadside data and each database entry.

In various embodiments, the roadside vehicle characteristic metadata 304 may be used by the service 102 to optimize the comparison of the roadside data 114 and the one or more database entries 310. In certain examples, the roadside vehicle characteristic metadata 304 may be used to narrow the range of entries 310 compared to the roadside data 114. For example, the service 102 may filter the database entries 310 based on the roadside vehicle characteristic metadata 304. In one instance, the service 102 may filter the entries 310 based on any of: time of day, direction of travel, geolocation, contrast percentage, partial plate processing, ranging, color, registered user, direction of image (frontward-facing or rearward-facing), color percentage presence, volume of alphanumeric characters or spacing, volume of edges or curves, amount of vertical or horizontal lines, and location of the vehicle license plate on the vehicle, among other vehicle characteristics. In various other embodiments, such roadside vehicle characteristic metadata 304 may be used to increase the accuracy of recognized characters within the vehicle license plate of the roadside image 302. Specifically, individual sets of roadside vehicle characteristic metadata 304 may be compared with sets of vehicle characteristic metadata 314 within a database entry 310 to determine a match between a known license plate and the license plate of the roadside image 302. For example, the service 102 may compare a detected color of the vehicle to a color of a vehicle associated with the vehicle characteristic metadata of each database entry 310. Responsive to matching the roadside data 114 to a database entry 310, the service 102 may query a Motor Vehicle Agency database for driver or vehicle information corresponding to the matched license plate.

Responsive to the recognition of one or more characters within the vehicle license plate of the roadside image 302, the service 102 may also generate a second confidence factor 316 based at least in part on the similarity of the recognized character, and one or more of the database entries 310. The second confidence factor 316 represents the strength of the similarity between the recognized character and a particular database entry 310, and in one example may be represented as a percentage. In various embodiments, the service 102 may compare the second confidence factor 316 to a threshold (similar to the first confidence factor) to determine whether further analysis of the roadside data 114 is required. For example, if the service 102 determines that the confidence factor 316 has not met the confidence threshold, the service 102 may then partition the roadside data 114 into one or more segments, and assign the one or more segments to a crowd source analysis provider 106. While discussed with reference to a single character for the convenience of description, in various embodiments, the second confidence factor 316 may refer to a series of recognized characters of the vehicle license plate, such as a recognized vehicle registration identifier.

In various embodiments, one or more recognized characters of the received roadside data 114 may generate a confidence factor 316 that exceeds the confidence threshold. Responsive to determining that the confidence threshold has been met (i.e., exceeded), the service 102 may generate a new database entry 310 based at least in part on the received roadside data 114, or update a current database entry 310 based at least in part on the received roadside data 114. In particular, the roadside image 302 of the vehicle license plate may be used to update or generate new vehicle license plate fingerprint data 312, and the roadside vehicle characteristic metadata 304 may be used to update or generate new vehicle characteristic metadata 314. Dynamic integrations of constantly received roadside data (e.g., roadside data 114), enables the continuous generation of new database entries 310, and the constant access to updated information.

In various embodiments, responsive to receiving the roadside data 114, the service 102 may partition the roadside data 114 into one or more segments, and assign the segments to one or more crowd source analysis providers 106 (block 318). Specifically, the service 102 may partition the roadside image 302 of the vehicle license plate into one or more segments 320, each segment 320 having at least one character, and assign each segment 320 to one or more crowd source analysis provider 106. In such embodiments, the service 102 may partition and assign the roadside data 114 and omit the example OCR processes and/or database entry comparison processes as discussed above. That is, in various embodiments the service 102 may partition and assign the roadside data 114 in conjunction with one, or both, of the OCR processes and database entry comparison processes, or as an alternative to one, or both, of the OCR processes and database entry comparison processes.

As discussed herein, partitioning and assigning of the roadside data 114 to one or more crowd source analysis provider 106 is similar to computational parallel processing during which a single task is allocated as multiple sub-tasks simultaneously to multiple processing machines, which each operate independently and cooperatively to resolve the task. Such embodiments fundamentally improve the speed and efficiency of the license plate matching system 100 compared to conventional techniques. In various embodiments, each crowd source analysis provider 106 includes an external crowd source reviewer, such as one or more networked computers, that coordinate their actions by one or messages with the service 102.

For example, each crowd source analysis provider 106 may include a user device which includes controls that perform various functions in an application to recognize one or more characters of a received segment 320 of the roadside data 114. Specifically, crowd source analysis providers 106 leverage the intelligence of large groups of reviewers on an individual by individual basis to recognize one or more characters within the vehicle license plate of the roadside image 302. In contrast to traditional human review procedures, crowd source analysis providers 106 allow expedited review through parallel processing, in addition to providing increased security due to the segmented nature of possibly sensitive roadside data 114. As discussed in further detail below, parallel processing among one or more crowd source analysis provider 106 also permits increased scalability through the increased supply of reviewers. Further, the implementation of bonuses, games, prizes, contests, and other incentives may improve accuracy and efficiency of each associated reviewer.

FIGS. 3A-3B illustrate an example roadside image of a vehicle license plate segmented into three segments 320, each of the segments 320 having at least one character of the vehicle license plate. As shown, each segment 320 of the roadside image of the vehicle license plate may include a vertical slice of a whole vehicle license plate portion of the roadside image 302. Slicing the license vertically, as shown, ensures that the confidentiality of an associated vehicle, driver, or owner, is maintained while each segment 320 is being reviewed. Furthermore, vertical slices may minimize reviewer interaction with an individual segment 320, increasing the output of a particular reviewer for any given period of time. While shown in the example of FIGS. 3A-3B as vertical slices, in various other embodiments each segment 320 may include a horizontal slice, a diagonal slice, or any other directional slice to crop a portion of the roadside image 302 of the vehicle license plate. In various other embodiments, the service 102 may blur, cover, remove, or otherwise obscure a portion of the roadside image 302 of the vehicle license plate to partition the image 302 and generate one or more segments 320.

Once received at a crowd source analysis provider 106, the provider 106, generally via a crowd source reviewer, analyzes the segment 320 of the roadside image 302 to recognize one or more characters within the received segment 320. For example, in FIGS. 3A-3B, the crowd source analysis providers 106 are shown as recognizing the characters, "SA", "MP", and "LE." In various embodiments, each crowd source reviewer may include a user interacting via one or more controls of a user device executing the software component 126. Responsive to receiving the segment 320, the user device displays the segment 320 for reviewer interaction. In such an example, the reviewer (i.e., user of the user device) may manually enter the recognized characters through a user interface (e.g., visual display) of the user device. For example, the reviewer may recognize characters by typing the characters in via a keyboard.

In certain embodiments, segments 320 may be provided to the crowd source analysis provider 106 with one or more corresponding OCR images generated by the OCR algorithm 306, or one or more composite image of a virtual vehicle license plate. In such situations, reviewers may select one or more options within the visual display to confirm that the OCR image (or composite image) does or does not match the character within the received segment 320. In certain examples, reviewers may be presented with multiple character recognition selections arranged in a multiple-choice format. While in certain instances, each segment 320 of the roadside image 302 of the vehicle license plate may include a single character, in various embodiments, the assigned segments 320 may include the entire series of characters (e.g., vehicle registration identifier) of the vehicle license plate. Further, while FIGS. 3A-3B illustrate each segment 320 assigned to a single crowd source analysis provider 106, it is appreciated that in various embodiments each segment 320 may be assigned to numerous providers 106 in parallel.

As discussed herein, in at least one embodiment the plurality of crowd source analysis providers 106 may include a license plate matching software component within a web-based application, or a mobile application, executing one or more computing devices, such as a user device. Similar to the user device 110, in various embodiments the user device of the crowd source analysis provider 106 may include a cell phone, smart phone, PDS, tablet computer, laptop, or other computing device. For example, the software component may be a plug in for a mobile application video game. In one instance, the software component may serve as an alternative credit provision structure (e.g., payment system) for a video game, puzzle, or other form of visual amusement. Credits or points may be received in response to reviewing one or more segments and/or matching one or more license plate characters, and may be redeemed by the reviewer within the video game, puzzle, or other form of visual amusement. In some instances, the credits may be used to acquire improvements within the application, advancements, or additional content, commonly referred to as in-app purchases. In various other examples, reviewers may receive direct monetary compensation for reviewing segments of roadside data. Accordingly, in various examples, the reviewer may be incentivized to identify license plate characters to enhance gameplay.

In certain other examples, the software component may include a license plate matching video game, a puzzle, or other form of visual amusement. Example video games may include matching games, hidden object games, time management games, puzzle games, tactical games, and educational games. Accordingly, at least one example of the license plate matching software component discussed herein includes a license plate matching video game executing on a game system, which may include the user device of a crowd source analysis provider 106. The game system may include a memory, a user interface (e.g., a visual display), and at least one processor in communication with the memory and the visual display. The visual display may include a set of player controls, each of the player controls manipulatable by the reviewer to create command signals within the license plate matching video game. Within the video game, the command signals specify one or more movements of an avatar, movements of a game piece, movements of a cursor, delineations of an object, selections of an object, and/or any other virtual actions, to achieve an objective of the video game. While in one instance the primary objective of the video game may be to recognize the one or more character within the received segment 320, in various embodiments, recognition of the one or more characters within the received segment 320 may assist the reviewer in achieving another objective.

In other particular instances, the software component may include an automated test to tell humans and computing devices apart, such as a CAPTCHA (Computer Automated Public Turing test). Each segment 320 of the roadside image 302, and in some embodiments the entire roadside image 302, may be used as a distorted image to test a reviewer to determine whether he or she is a human. Upon successful recognition of the characters within the segment 320, the software component may grant access to a web-page or other destination. In at least one example, the service 102 provides an answer key corresponding to the segment 320 used within the automated test. The answer key may include one or more known characters, the correct recognition of which successfully solves the automated test. For example, the service 102 may provide a segment 320 including the characters "SAMPLE," with an answer key including the characters "SA." A reviewer answer of "SAMPLC" would then solve the automated test, based on the correct recognition of the "S" character and the "A" character, despite the incorrect recognition of the "C" character. The remaining recognized characters (including the "C" character) may be used by the service 102 to generate a confidence factor, and match the corresponding license plate to one or more known license plates.

As FIGS. 3A-3B further show, in various embodiments the service 102 may receive the one or more recognized characters from the crowd source analysis providers 106. Responsive to receiving the recognized characters, the service 102 may combine the recognized characters and match the corresponding vehicle license plate to a known vehicle license plate. That is, in various embodiments combination of individually recognized characters by the service 102 allows the identification of the series of characters within the vehicle license plate, such as the vehicle registration identifier. Responsive to matching the vehicle license plate, the service 102 may query a Motor Vehicle Agency database for driver or vehicle information corresponding to the matched license plate.

While in one example, the service 102 may be configured to partition the roadside data into numerous segments (e.g., vertical slices of the roadside image of the vehicle license plate), in certain other examples, the service 102 may also be configured to provide the roadside image of the vehicle license plate (as a whole) to the one or more crowd source analysis provider 106 for analysis. In such an embodiment, the service 102 may also provide one or more composite image of a virtual vehicle license plate, such as those discussed above with reference to at least the example process flow illustrated in FIG. 2. Responsive to receiving the roadside image of the vehicle license plate and the one or more composite image of a virtual vehicle license plate, the crowd source analysis provider 106, generally via a crowd source reviewer, analyzes the roadside image of the vehicle license plate to recognize one or more characters within the image. For example, the crowd source reviewer may recognize at least one character of the series of characters of the vehicle license plate based on a comparison to the one or more composite image of a virtual vehicle license plate. Specifically, the user device may display the roadside image of the vehicle license plate simultaneously with one or more of the composite images, permitting the reviewer to select the composite image having a series of characters that most resembles the series of characters of vehicle license plate within the roadside image. Multiple composite images of virtual vehicle license plates may be displayed in serial order or in parallel.

In response to receiving the recognized characters, the service 102 may also generate a third confidence factor based at least in part on the similarity of the recognized characters, and the known vehicle license plate. Similar to the first confidence factor and the second confidence factor 316, the third confidence factor represents the strength of the similarity between the recognized characters, and the characters of the known vehicle license plate. In various embodiments, the service 102 may compare the third confidence factor to a threshold (similar to the first and second confidence factor) to determine whether further analysis of the roadside data 114 is required. For example, if the service 102 determines that the confidence level has not met the confidence threshold, the service 102 may then distribute the roadside data to one or more traditional human reviewers for further analysis (block 322). While discussed with reference to a single character for the convenience of description, in various embodiments, the third confidence factor may refer to a series of recognized characters within the license plate of the roadside image 302, such as a recognized vehicle registration identifier.

In various embodiments, one or more recognized characters of received roadside data 114 may generate a third confidence factor that exceeds the confidence threshold. Responsive to determining that the confidence threshold has been met (i.e., exceeded), the service 102 may generate a new database entry 310 based at least in part on the received roadside data 114, or update a current database entry 310 based at least in part on the received roadside data 114. In particular, the roadside image 302 of the vehicle license plate may be used to update or generate new vehicle license plate fingerprint data 312, and the roadside vehicle characteristic metadata 304 may be used to update or generate new vehicle characteristic metadata 314.

Figure 4:
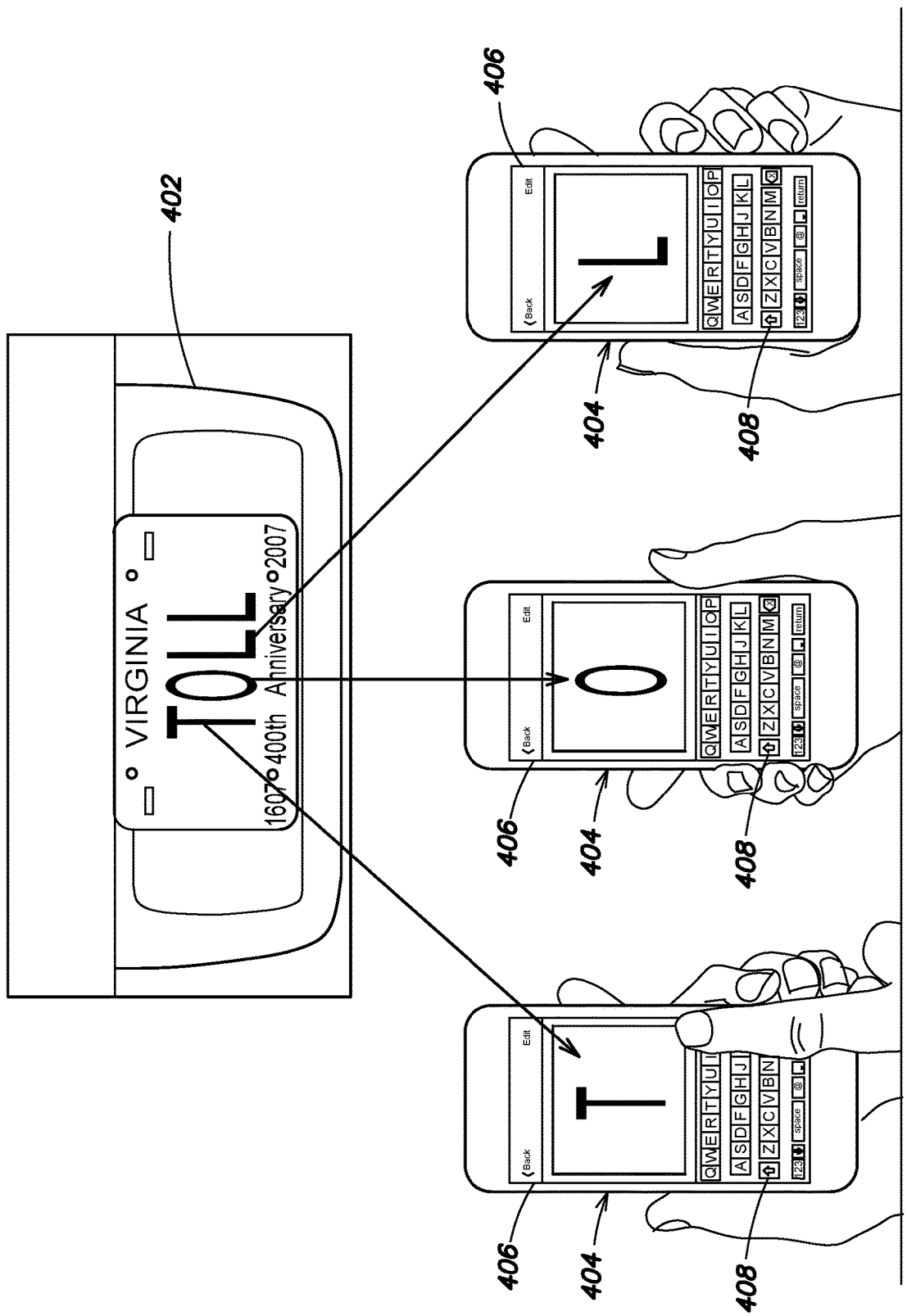
FIG. 4 is an example illustration of visual displays of user devices according to various aspects of the present invention.
Figure 5:
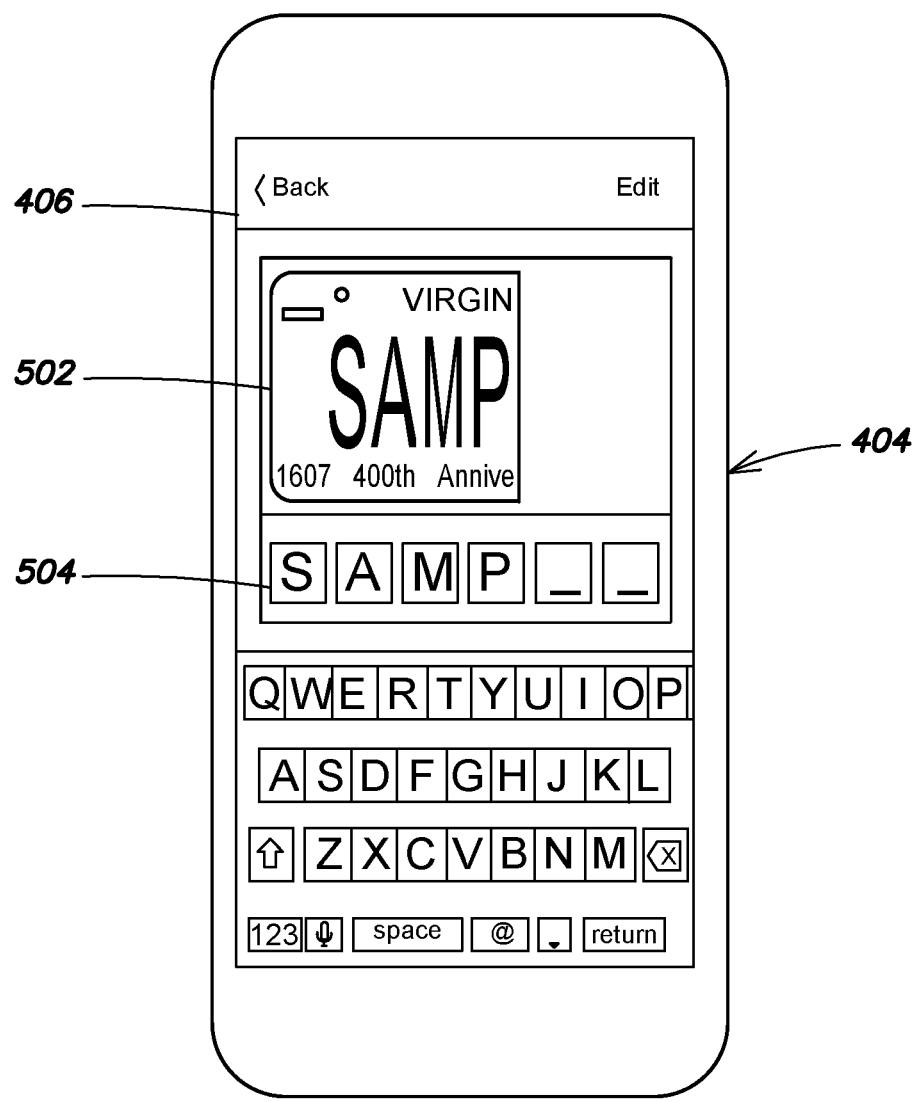
FIG. 5 is another example illustration of a visual display of a user device according to various aspects of the present invention.
Figure 6:
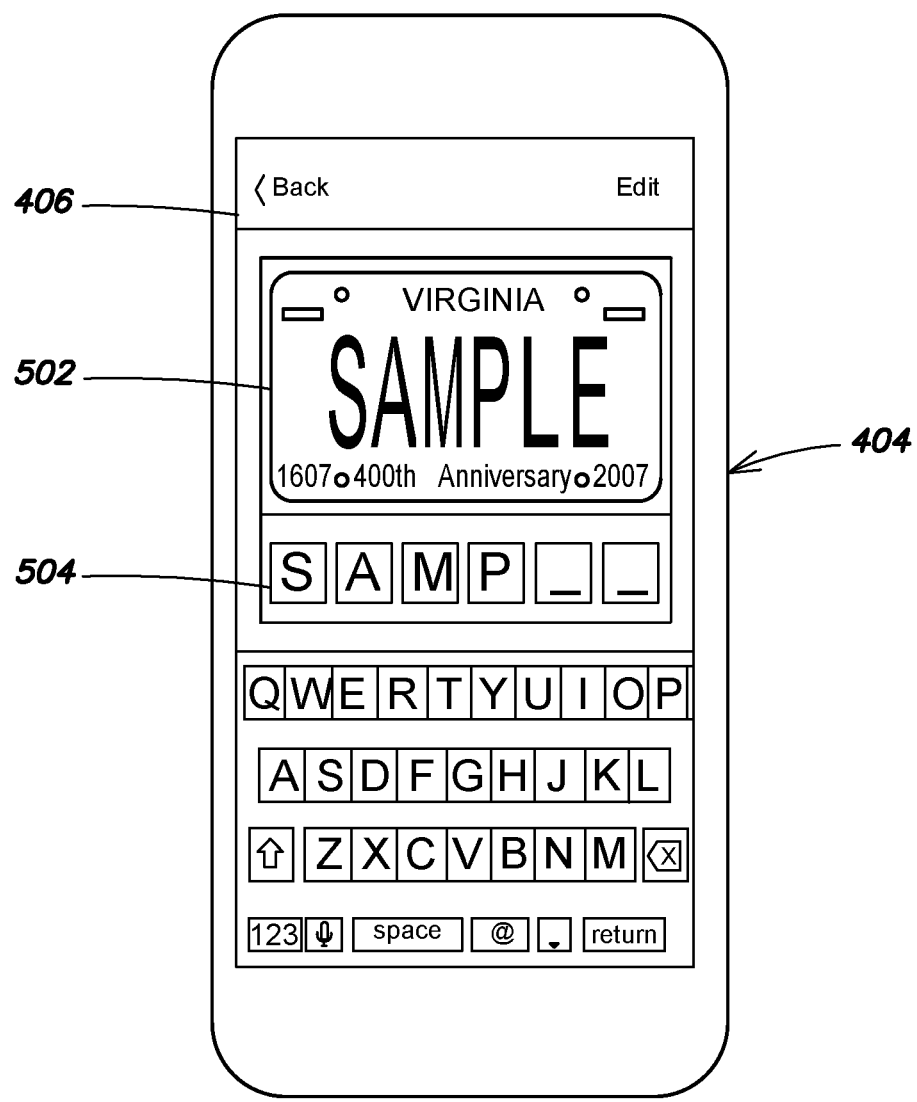
FIG. 6 is another example illustration of a visual display of a user device according to various aspects of the present invention.

Turning now to FIGS. 4, 5, and 6, shown are example illustrations of visual displays of a user interface according to aspects of the invention. FIGS. 4-6 are discussed with continuing reference to the example license plate matching system 100 shown in FIG. 1. As discussed above, in various embodiments the service 102 may communicate with one or more crowd source analysis providers 106 to receive recognized characters of a vehicle license plate captured within a roadside image 402. Specifically, each crowd source analysis provider 106 may include a software component executing on a user device 404, the user device 404 providing a visual display 406 through which a reviewer (i.e., a user) may view and recognize the one or more characters within a received segment. As discussed herein, the software component may be included within a mobile application, such as a video game application downloaded or purchased from an application store.

Specifically, FIG. 4 shows a roadside image 402 of a vehicle license plate partitioned among three user devices 404, each user device 404 displaying an individual segment of the partitioned image 402. A first user device is shown displaying a segment having a "T" character, a second user device is shown displaying a segment having an "O" character, and a third user device is shown displaying a segment having an "L" character. In various embodiments, reviewers interact with the visual display 406 to recognize the character of the displayed segment. In the shown embodiment, each visual display 406 includes a keyboard of characters 408, the selection of which is used to recognize the displayed character. Responsive to receiving the selection of a character within the visual display 406, the user device 404 may transmit the recognized character (i.e., the selected character), to the service 102, as discussed above.

Turning to FIG. 5, shown is a more detailed visual display 406 of the user device 404 according to at least one embodiment. In the shown example, the user device 404 has received and displayed a segment of a roadside image including the characters "S", "A", "M", and "P". The roadside image of the vehicle license plate may be shown in an image pane 502 of the visual display 406. Also included in the visual display 406, the user device 404 may provide one or more answer blocks 504 corresponding in number to each character within the displayed segment. Each answer block 504 may represent a character of the displayed segment, those blocks 504 remaining vacant until the reviewer selects a corresponding character. For example, FIG. 5 shows a reviewer as having selected an "S" character for the "S" character of the displayed segment, an "A" character for the "A" character of the displayed segment, an "M" character for the "M" character of the displayed segment, and a "P" character for the "P" character of the displayed segment. As there are no further characters shown in the displayed segment, no further characters are entered in the remaining answer blocks 504. Responsive to entry of the recognized characters, the reviewer may select an "enter" or "submit" indicator to transmit the recognized characters to the service 102.

Similar to FIG. 5, FIG. 6 shows a more detailed visual display 406 of the user device 404 according to at least one embodiment. In the shown example, the user device 404 has received a segment of a roadside image including the characters "S", "A", "M", "P", "L", and "E". That is, the received segment includes the entire series of characters (e.g., vehicle registration identifier) of the vehicle license plate captured within the roadside image. Also included in the visual display 406, the user device 404 may provide one or more answer blocks 504 corresponding to each character within the displayed segment. Each answer block 504 may represent a character of the shown segment, those blocks 504 remaining vacant until the reviewer selects a corresponding character. For example, FIG. 5 shows a reviewer as having selected an "S" character for the "S" character of the displayed segment, an "A" character for the "A" character of the displayed segment, an "M" character for the "M" character of the displayed segment, and a "P" character for the "P" character of the displayed segment.

While in certain implementations, reviewers may recognize characters within a received segment of a roadside image by manually selecting one or more character keys within the visual display 406, in various other implementations, the user device 404 may receive the recognition of a character by voice command, reviewer movement-based commands (e.g., nodding left or right), selection of a yes or no indicator, selection of a multiple choice answer, and/or directional touch input (e.g., swiping left, right, up, or down), to name a few. Specifically, the visual display 406 may provide one or more suggested options permitting the user to confirm or reject a possible match. Such techniques may be used to further increase the speed and efficiency of the crowd source analysis provider 106, and in particular, the associated reviewers. In various embodiments, the crowd source analysis provider 106 may also provide one or more incentives to reviewers to increase their speed and/or efficiency.

For example, the crowd source analysis provider 106 may provide prizes, gifts, and/or rewards. In one particular example, each submitted recognized character or matched vehicle license plate may accumulate a credit or point that can be exchanged for goods or services or in-application benefits. Credits or points may then be redeemed at an online store, and in some instances, may be used to acquire improvements within the application, commonly referred to as in-app purchases. In various other examples, reviewers may receive direct monetary compensation for reviewing segments of roadside data. In one example, credits, points, or monetary compensation may be based on the volume of received roadside data and/or the availability of additional crowd source analysis providers 106. For instance, compensation, or the value or credits or points, may increase when the supply of roadside data is large and/or the availability of additional crowd source analysis providers 106 is low. Similarly, compensation, or the value of credits or points, may be reduced when the supply of roadside data is low, or the availability of additional crowd source analysis providers 106 is high.

In various embodiments, reviewers using a mobile application or web-based application of a crowd source analysis provider 106 may create one or more user profiles. User profiles may be used to store personal data associated with a particular reviewer, and may be used to provide performance statistics. For instance, performance statistics may include the accuracy of a reviewer compared to others, the speed of a reviewer compared to others, and/or the volume of characters recognized by a reviewer compared to others. For example, the service 102 may periodically assign one or more "test" segments to determine the performance of a particular reviewer, and specifically, ascertain the accuracy of that reviewer compared to others. A response to the test segment (e.g., one or more recognized characters) received from the designated reviewer may be compared to responses received from other reviewers to validate performance. Reviewers falling below a desired level of performance may be penalized, and in some instances, banned from further review. In certain other examples, reviewers falling above the desired level of performance may be rewarded with additional incentives such as credits, points, or monetary compensation. Such aspects and embodiments further ensure the accuracy of the system 100.

As discussed with reference to FIG. 1, vehicle license plate metadata may be received from one or more user devices 110. In various embodiments, the vehicle license plate metadata received from a user device 110 may include images of a vehicle license plate submitted via the license plate matching application executing on the user device 110. For instance, the license plate matching application may ask the reviewer for an image of a vehicle license plate and vehicle characteristic metadata for his or her vehicle when the application is downloaded or purchased. Received vehicle license plate metadata may be used to generate one or more new database entries, as discussed with reference to the service 102 of FIG. 1. Specifically, by submitting such information the reviewer may register his or her vehicle with the service 102. Reviewer provided information may include one or more uploaded images and vehicle characteristic metadata, such as vehicle make, vehicle model, color, and issuing authority, to name a few.

Example Computing System

Figure 7:
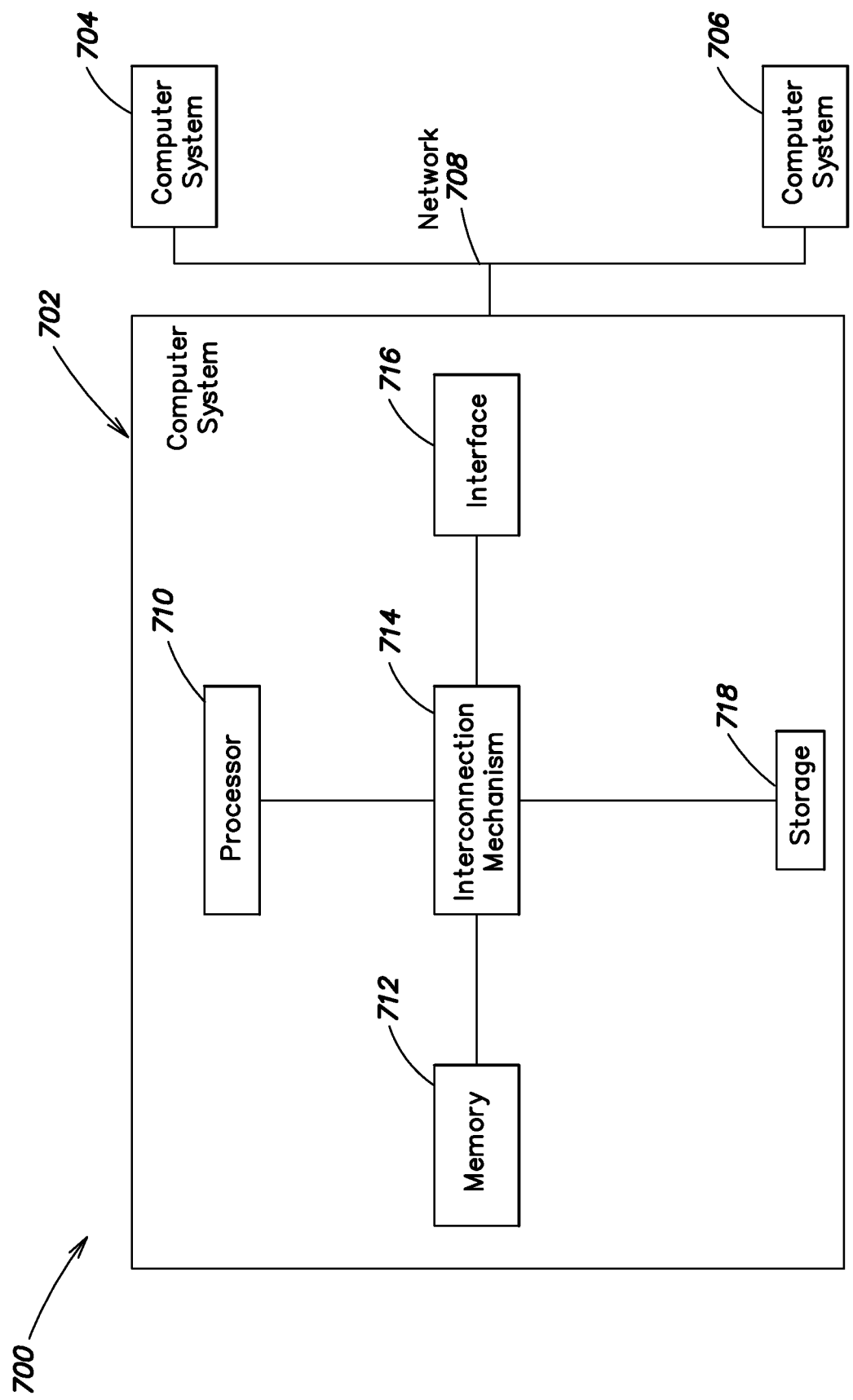
FIG. 7 is a block diagram of an example computer system with which various aspects of the present invention may be practiced.

Referring to FIG. 7, there is illustrated a block diagram of a distributed computer system 700, in which various aspects and functions are practiced. As shown, the distributed computer system 700 includes one or more computer systems that exchange information. More specifically, the distributed computer system 700 includes computer systems 702, 704, and 706. As shown, the computer systems 702, 704, 706 are interconnected by, and may exchange data through, a communication network 708, which may include the network 122 shown in FIG. 1. The network 708 may include any communication network through which computer systems may exchange data. To exchange data using the network, the computer systems 702, 704, 706 and the network 708 may use various methods, protocols and standards, including, among others, Fibre Channel, Ethernet, Wireless Ethernet, Bluetooth, IP, IPV6, TCP/IP, UDP, DTN, HTTP, FTP, SMS, MMS, SS7, JSON, SOAP, CORBA, REST, and Web Services. To ensure data transfer is secure, the computer systems 702, 704, 706 may transmit data via the network 708 using a variety of security measures including, for example, SSL or VPN technologies. While the distributed computer system 700 illustrates three networked computer systems, the distributed computer system 700 is not so limited and may include any number of computer systems and computing devices, networked using any medium and communication protocol.

As illustrated in FIG. 7, the computer system 702 includes a processor 710, a memory 712, an interconnection element 714, an interface 716, and data storage element 718. To implement at least some of the aspects, functions, and processes disclosed herein, the processor 710 performs a series of instructions that result in manipulated data. The processor 710 may be any type of processor, multiprocessor or controller. Example processors may include a commercially available processor such as an Intel Xeon, Itanium, or Core processor; an AMD Opteron processor; an Apple A4 or A5 processor; an IBM Power5+ processor; an IBM mainframe chip; or a quantum computer. The processor 710 is connected to other system components, including one or more memory devices, by the interconnection element 714.

The memory 712 stores programs (e.g., sequences of instructions coded to be executable by the processor 710) and data during operation of the computer system 702. Thus, the memory 712 may be a relatively high performance, volatile, random access memory such as a dynamic random access memory ("DRAM") or static memory ("SRAM"). However, the memory 712 may include any device for storing data, such as a disk drive or other nonvolatile storage device. Various examples may organize the memory 712 into particularized and, in some cases, unique structures to perform the functions disclosed herein. These data structures may be sized and organized to store values for particular data and types of data.

Components of the computer system 702 are coupled by an interconnection element such as the interconnection element 714. The interconnection element 714 may include any communication coupling between system components such as one or more physical busses in conformance with specialized or standard computing bus technologies such as IDE, SCSI, PCI and InfiniBand. The interconnection element 714 enables communications, including instructions and data, to be exchanged between system components of the computer system 702.

The computer system 702 also includes one or more interface devices 716 such as input devices, output devices and combination input/output devices. Interface devices 716 may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 702 to exchange information and to communicate with external entities, such as users and other systems.

The data storage element 718 includes a computer readable and writeable nonvolatile, or non-transitory, data storage medium in which instructions are stored that define a program or other object that is executed by the processor 710. The data storage element 718 also may include information that is recorded, on or in, the medium, and that is processed by the processor 710 during execution of the program. More specifically, the information may be stored in one or more data structures specifically configured to conserve storage space or increase data exchange performance.

The instructions may be persistently stored as encoded signals, and the instructions may cause the processor 710 to perform any of the functions described herein. The medium may, for example, be optical disk, magnetic disk or flash memory, among others. In operation, the processor 710 or some other controller causes data to be read from the nonvolatile recording medium into another memory, such as the memory 712, that allows for faster access to the information by the processor 710 than does the storage medium included in the data storage element 718. The memory may be located in the data storage element 718 or in the memory 712, however, the processor 710 manipulates the data within the memory 712, and then copies the data to the storage medium associated with the data storage element after processing is completed. A variety of components may manage data movement between the storage medium and other memory elements and examples are not limited to particular data management components. Further, examples are not limited to a particular memory system or data storage system.

Although the computer system 702 is shown by way of example as one type of computer system upon which various aspects and functions may be practiced, aspects and functions are not limited to being implemented on the computer system 702 as shown in FIG. 7. Various aspects and functions may be practiced on one or more computers having a different architectures or components than that shown in FIG. 7. For instance, the computer system 702 may include specially programmed, special-purpose hardware, such as an application-specific integrated circuit ("ASIC") tailored to perform a particular operation disclosed herein. While another example may perform the same operation using a grid of several general-purpose computing devices running MAC OS System X with Intel processors and several specialized computing devices running proprietary hardware and operating systems.

The computer system 702 may be a computer system including an operating system that manages at least a portion of the hardware elements included in the computer system. In some examples, a processor or controller, such as the processor 710, executes an operating system. Examples of a particular operating system that may be executed include a Windows-based operating system, such as, Windows Phone, Windows 7, or Windows 8 operating systems, available from the Microsoft Corporation, Android operating system available from Google, Blackberry operating system available from Blackberry Limited, a MAC OS System X operating system or an iOS operating system available from Apple, one of many Linux-based operating system distributions, for example, the Enterprise Linux operating system available from Red Hat Inc., or UNIX operating systems available from various sources. Many other operating systems may be used, and examples are not limited to any particular operating system.

The processor 710 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, Ruby, Objective-C, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Example License Plate Matching Process

As described above with reference to at least FIGS. 1-6, several embodiments perform processes that improve known schemes for license plate matching. In some embodiments, these processes are executed by a license plate matching system, such as the system 100 described above with reference to FIG. 1. One example of such a process is illustrated in FIG. 8. Specifically, FIG. 8 illustrates a general process flow for the license plate matching process 800 of one embodiment. Further details of each act within the process flow of FIG. 8 are further discussed with reference to FIGS. 9A, 9B, and 9C. In the shown example, the process 800 may include acts of receiving roadside data, executing one or more OCR algorithms, querying a database of indexed entries, partitioning and assigning the roadside data to one or more crowd source analysis providers, and distributing the roadside data for human review. It is appreciated that in certain embodiments acts 804-810 may be performed in the order illustrated in FIG. 8. However, in various other embodiments, acts 804-810 may be performed in any other suitable order and each act may be performed for any suitable number of iterations. Furthermore, in certain embodiments acts 804-810 may be performed as alternatives. That is, in at least one embodiment, the process 800 may begin by receiving roadside data (act 802) and proceed directly to querying the database of indexed entries (act 806) or partitioning and assigning the roadside data to one or more crowd source analysis providers (act 808).

Figure 9A:
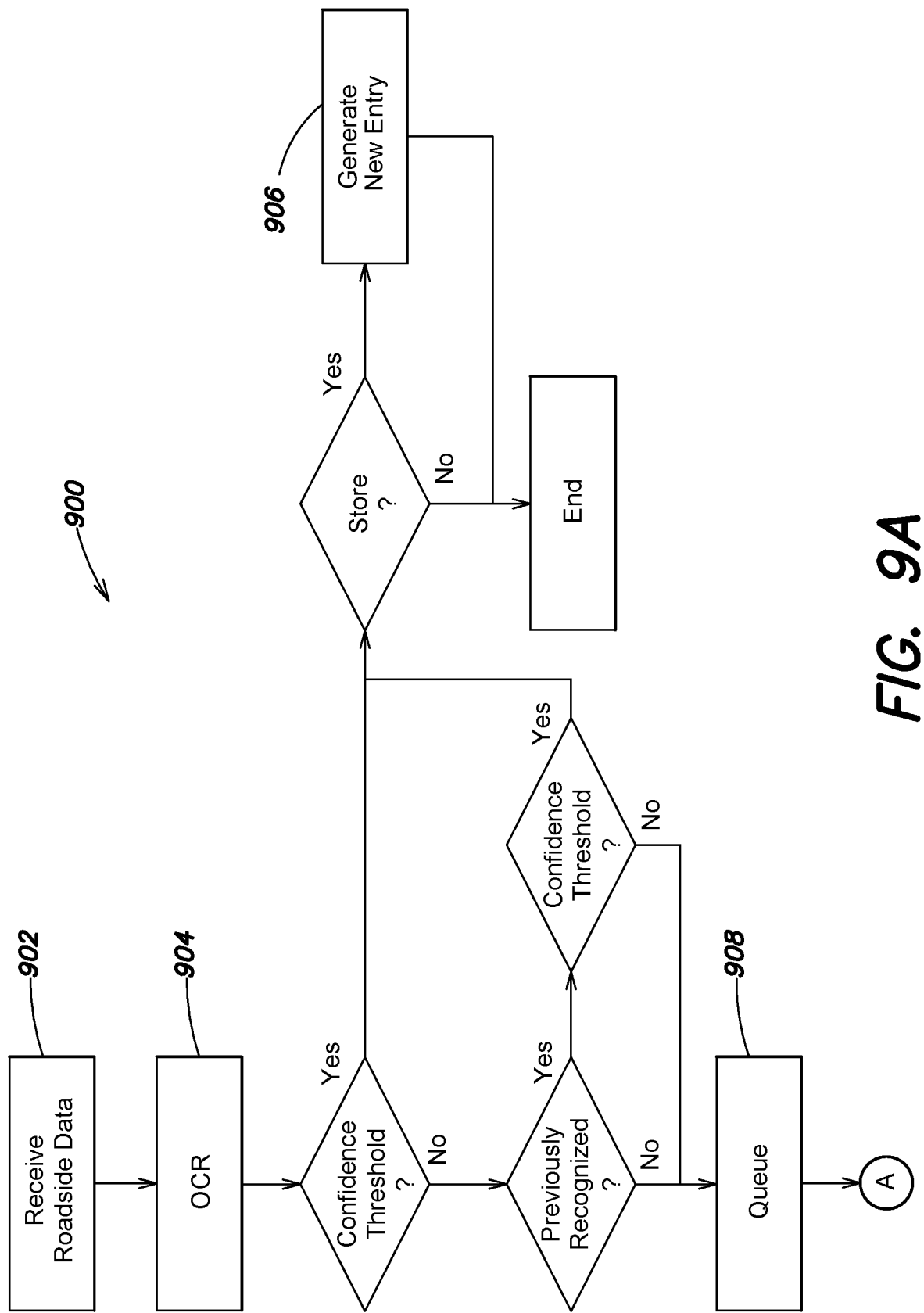
FIGS. 9A, 9B, 9C, and 9D are a detailed process flow of the process flow for license plate matching of FIG. 8, according to various aspects of the present invention.
Figure 9B:
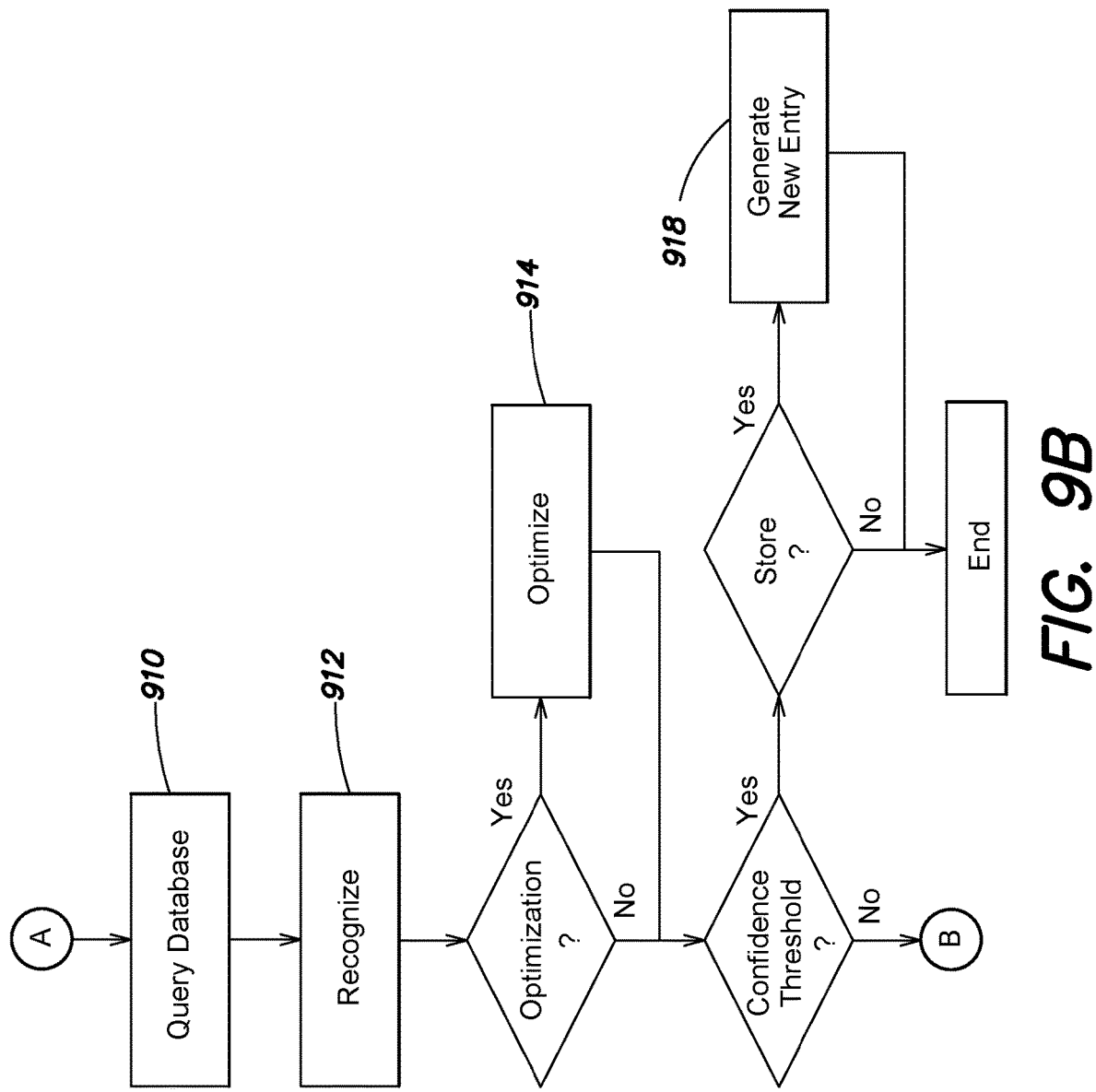
Figure 9C:
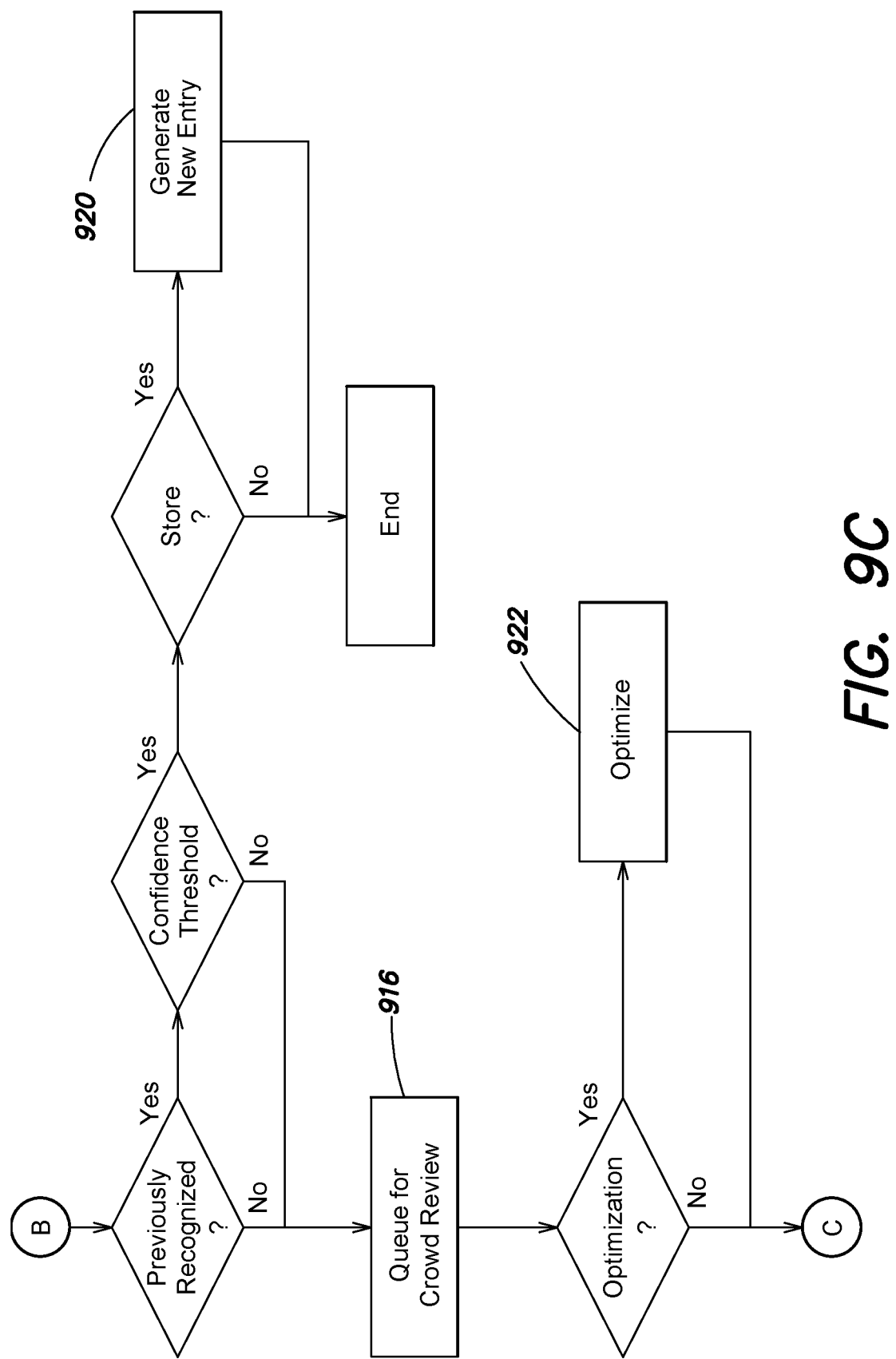
Figure 9D:
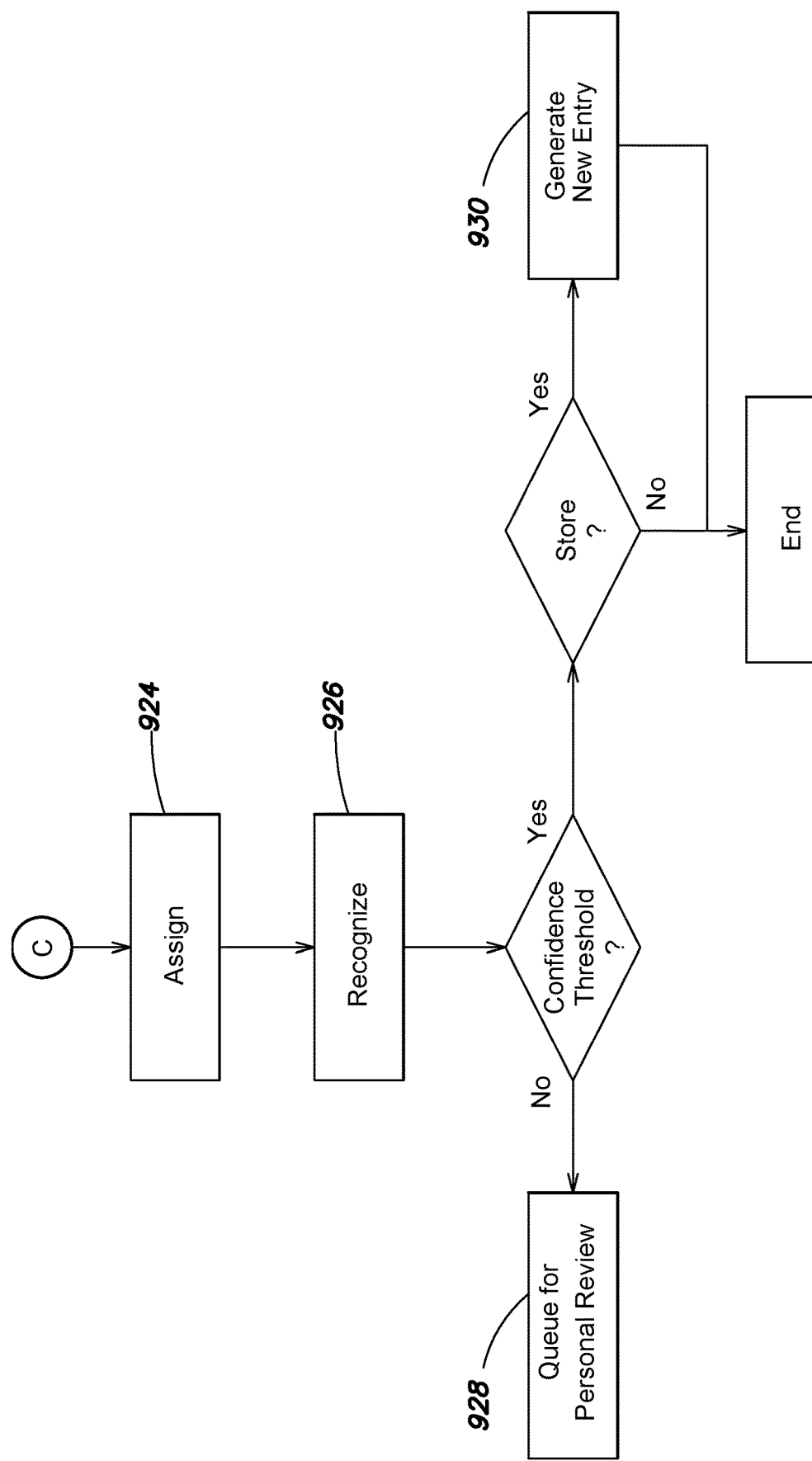

FIGS. 9A, 9B, and 9C show a more detailed process flow of the improved process for license plate matching shown in FIG. 8. FIGS. 9A, 9B, and 9C are discussed within continuing reference to components of the example license plate matching system 100 shown in FIG. 1. In various embodiments, the process 900 begins with act 902. In act 902 the process 900 includes receiving roadside data including at least a roadside image of a vehicle license plate. As discussed with reference to the system 100 of FIG. 1, in various embodiments this may include receiving roadside data 114 from a remote device 108 configured to optically capture a vehicle license plate image, such as a camera, video recorder, or other optic sensing device. In various embodiments, the roadside data 114 includes roadside vehicle characteristic metadata. As such, act 902 may also include receiving roadside vehicle characteristic metadata from the remote device 108. Such roadside data may be received in real-time immediately following the capture of the roadside data, or received after aggregation with numerous other sets of roadside data.

In response to receiving the roadside data, the process 900 may include executing one or more OCR algorithms to recognize one or more characters within the vehicle license plate of the roadside image. For instance, act 904 may include detecting characters within the vehicle license plate and comparing each character to a stored glyph. Responsive to the recognition of one or more characters within the vehicle license plate based on the comparison, the process 900 may include generating a first confidence factor based at least in part on the similarity of the recognized character, and one or more stored glyphs, and comparing the first confidence factor to a confidence threshold. For instance, the service 102 may compare the first confidence factor to a confidence threshold to determine whether further analysis of the roadside data is required.

If it is determined that the first confidence factor exceeds the confidence threshold (i.e., is greater than the threshold), the process 900 then includes determining if the received roadside data should be stored as a new database entry, or should be used to update an existing database entry. For example, after combining the recognized characters, if a database entry corresponding to the recognized characters already exists, a new database entry may not be necessary, and the process 900 may end. However, if the roadside data includes metadata not included in a corresponding database entry, or no corresponding database entry exists, in act 906, the process 900 may include generating a new database entry based at least in part on the received roadside data.

In various embodiments, responsive to determining that the confidence threshold has not been exceeded, the process 900 may include determining whether the one or more characters of the vehicle license plate of the roadside image have been previously recognized. That is, the process 900 includes determining if the roadside image has already been processed. If the roadside data has been already processed, the process 900 may include determining whether the confidence factor corresponding to the previously recognized characters exceeded the confidence threshold. If the confidence threshold was exceeded, the process 900 then includes determining if storage was previously performed. If it is determined that no previous recognition was performed, or, the confidence level was not exceeded, the process 900 includes queuing the received roadside data for further comparison processes (act 908).

In act 910, the process 900 may include querying a database 104 having a plurality of indexed entries, each entry within the database 104 including at least vehicle license plate fingerprint data and vehicle characteristic metadata. Responsive to querying the database 104, the roadside data may be compared to individual entries within the database 104 to match a vehicle license plate associated with the roadside data to one or more vehicle license plates associated with database entries (act 912). Specifically, the process 900 may include comparing the roadside image of the vehicle license plate with the vehicle license plate fingerprint data of each database entry, and/or comparing the roadside vehicle characteristic metadata with the vehicle characteristic metadata of each database entry. In at least one embodiment, comparing the database entries to the roadside data includes binary matching vehicle license plate fingerprint data to the roadside image of the vehicle license plate.

As discussed with reference to FIG. 1, in various embodiments the roadside vehicle characteristic metadata may be used to recognize one or more characters within a roadside image of a vehicle license plate. Specifically, act 912 may include comparing individual sets of roadside vehicle characteristic metadata with sets of vehicle characteristic metadata within the database entries. For example, the color of a vehicle may be matched to vehicle characteristic color metadata of the entries within the database 104.

In various other embodiments, the roadside vehicle characteristic metadata may be used by the service 102 to optimize the comparison of the roadside image of the vehicle license plate and the one or more database entries. In certain examples, the roadside vehicle characteristic metadata may also be used to narrow the range of entries compared to the roadside data (act 914). For example, the process 900 may include filtering the database entries based on the roadside vehicle characteristic metadata. For instance, the process 900 may include filtering the entries based on any of: time of day, direction of travel, geolocation, contrast percentage, partial plate processing, ranging, color, registered user, direction of image (frontward-facing or rearward-facing), color percentage presence, volume of alphanumeric characters or spacing, volume of edges or curves, amount of vertical or horizontal lines, and location of the license plate on the vehicle, among other vehicle characteristics.

Responsive to the recognition of one or more characters within the vehicle license plate of the roadside image, the process 900 may include generating a second confidence factor based at least in part on the similarity of the recognized character, and one or more of the database entries. The process 900 may then include comparing the second confidence factor to a threshold (similar to the first confidence factor) to determine whether further analysis of the roadside data 114 is required. For example, if it is determined that the confidence level has not met the confidence threshold, the process 900 may proceed to queuing the roadside data for crowd analysis (act 916). However, if it is determined that the second confidence factor exceeds the confidence threshold (i.e., is greater than the threshold), the process 900 then includes determining if the received roadside data should be stored as a new database entry, or should be used to update an existing database entry, as discussed above (e.g., act 918).

In various embodiments, responsive to determining that the confidence threshold has not been exceeded, the process 900 may include determining whether the one or more characters of the vehicle license plate have been previously recognized by a crowd source analysis provider 106. That is, the process 900 includes determining if the roadside image has already been partitioned and assigned to one or more crowd source analysis provider 106. If the roadside data has been already processed, the process 900 may include determining whether the confidence factor corresponding to the previously recognized characters exceeded the confidence threshold. If the confidence threshold was exceeded, the process 900 includes determining whether storage was previously performed, and generating a new database entry (e.g. act 920) if storage was not performed. However, if it is determined that no previous recognition was performed, or, the confidence level was not exceeded, the process 900 includes queuing the received roadside data for partition and assignment to one or more of the crowd source analysis providers 116 (act 916).

In response to queuing the roadside data for partitioning and assigning to one or more crowd source analysis provider 106, the process 900 may include performing one or more acts of optimization. For instance, act 922 may include processing the roadside image of the vehicle license plate to increase reader comprehension, including adjusting contrast, lightening the roadside image, darkening the roadside image, sharpening the roadside image, cropping the roadside image, and/or adjusting a size of the roadside image. In act 924 the process 900 includes partitioning the roadside data, and in particular, the roadside image of the vehicle license plate, into one or more segments, and assigning the one or more segments to the one or more crowd source analysis providers 106. Specifically, each segment may include at least one character of the vehicle license plate.

In various embodiments, each crowd source analysis provider 106 includes an external crowd source reviewer such as one or more networked computers that coordinate their actions by one or messages with the service 102. For example, each crowd source analysis provider 106 may include a user device which includes controls that perform various functions in an application (e.g., license plate matching application) to display and recognize one or more characters of a received segment of the roadside data. Once received at a crowd source analysis provider 106, the process 900 may include recognizing one or more characters within the received segment of the roadside data (act 926). As discussed above, such processes may include receiving a selection via a visual display of a user device from a crowd source reviewer 106.

Responsive to the recognition of one or more characters of the roadside image, the recognized characters may be received and combined, and the process 900 may include generating a third confidence factor based at least in part on the similarity of the recognized characters, and one or more known license plate characters. The process 900 may include comparing the third confidence factor to a confidence threshold (similar to the first and second confidence factor) to determine whether further analysis of the roadside image of the vehicle license plate is required. For example, if it is determined that the confidence level has not met the confidence threshold, the process 900 may proceed to queuing the roadside data for human review (act 928). However, if it is determined that the third confidence factor exceeds the confidence threshold (i.e., is greater than the threshold), the process 900 then includes determining if the received roadside data should be stored as a new database entry, or should be used to update an existing database entry, as discussed above (e.g., act 930).

Accordingly, aspects and embodiments are directed to systems for license plate matching, and methods of using the same. Certain examples use roadside images of a vehicle license plate, as well as other characteristics associated with a corresponding vehicle, to match the vehicle's license plate to a known vehicle license plate. In a particular example, comparison of a roadside image of a vehicle license plate to one or more stored database entries of vehicle license plate fingerprint data allows accurate recognition of alphanumeric characters within the license plate at a high level of confidence. In certain examples, the system may also be configured to partition and assign one or more segments of the roadside image for distributed analysis and parallel processing at one or more of a plurality of crowd source analysis providers. Accordingly, various aspects and embodiments provide a more accurate and more efficient license plate matching system, compared to conventional OCR techniques.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A system for license plate matching comprising:
    a system interface configured to receive roadside data from a remote device, the roadside data including at least a roadside image of a first vehicle license plate;
    a database having a plurality of indexed entries, each entry of the plurality of entries including at least vehicle license plate fingerprint data and vehicle characteristic metadata, the vehicle license plate fingerprint data including image data extracted from a dynamically generated composite image of a virtual vehicle license plate; and
    at least one processor operatively connected to a memory, the system interface, and the database, the processor when executing configured to:
        for each of the plurality of indexed entries of the database execute the steps consisting of:
        dynamically generate the composite image of the virtual vehicle license plate from received license plate metadata that specifies a set of license plate characters, a license plate issuing authority, and a license plate type of the virtual vehicle license plate, the composite image of the virtual vehicle license plate thereby emulating an actual license plate image and including the set of license plate characters, the license plate issuing authority, and the license plate type; and
        extract the vehicle license plate fingerprint data from the corresponding composite image of the virtual vehicle license plate to generate the respective entry;
        execute a query against the database based on the roadside data;
        compare at least a portion of the entries to the roadside data, the processor when executing being further configured to compare the roadside image of the first vehicle license plate and at least the corresponding virtual vehicle license plate when comparing the portion of the entries and the roadside data; and
        generate a confidence factor based in part on a degree of similarity between at least one individual entry of the portion of the entries and the roadside data.

2. The system for license plate matching according to claim 1, wherein the first vehicle license plate includes at least a first series of license plate characters, and wherein in comparing the roadside image of the first vehicle license plate and the vehicle license plate fingerprint data, the processor when executing is further configured to compare the vehicle license plate fingerprint data and the roadside image of the first vehicle license plate so as to recognize at least one of the first series of characters.

3. The system for license plate matching according to claim 2, wherein the first series of characters includes a vehicle registration identifier.

4. The system for license plate matching according to claim 1, wherein the roadside data further includes roadside vehicle characteristic metadata, and wherein in comparing the portion of the entries to the roadside data, the processor when executing is further configured to compare the roadside vehicle characteristic metadata and at least the corresponding vehicle characteristic metadata of the portion of the entries.

5. The system for license plate matching according to claim 4, wherein the vehicle characteristic metadata includes at least one of speed, color, size, classification, age, tire noise, metal content, axes count, tire count, aerodynamic characteristics, engine noise, vehicle noise, and spatial contours.

6. The system for license plate matching according to claim 1, wherein the processor when executing is further configured to compare the confidence factor to a confidence threshold, and in response to a determination that the confidence factor is greater than the confidence threshold, generate a new indexed entry based at least in part on the roadside data.

7. The system for license plate matching according to claim 1, wherein the system interface is further configured to receive the roadside data from a user device.

8. The system for license plate matching according to claim 1, wherein the database includes one or more cloud database instances provisioned among one or more cloud database providers.

9. The system for license plate matching according to claim 1, wherein the vehicle license plate fingerprint data of each entry includes at least one binary index.

10. The system for license plate matching according to claim 9, wherein each entry further includes a field summing binary index bits included in the entry.

11. The system for license plate matching according to claim 1, wherein the at least one processor is further configured to:
    partition the roadside image of the first vehicle license plate into a plurality of segments including a plurality of characters of the first vehicle license plate;
    assign each of the plurality of segments to one or more crowd source analysis providers configured to recognize each of the plurality of characters;
    receive and combine the recognition of each character to provide a reconstruction of the plurality of characters of the first vehicle license plate; and
    match the first vehicle license plate with the virtual vehicle license plate based on the reconstruction of the plurality of characters.

12. The system for license plate matching according to claim 1, wherein the composite image of the virtual vehicle license plate consists of the set of license plate characters, the license plate issuing authority, and the license plate type of the virtual vehicle license plate.

13. A method for license plate matching, the method comprising:
generating a plurality of indexed entries for a database, the database having a plurality of indexed entries, each entry of the plurality of entries including at least vehicle license plate fingerprint data and vehicle characteristic metadata, the vehicle license plate fingerprint data including image data extracted from a dynamically generated composite image of a virtual vehicle license plate, and for each of the plurality of indexed entries of the database execute the steps consisting of:
dynamically generating the composite image of a virtual vehicle license plate from received license plate metadata that specifies a set of license plate characters, license plate issuing authority, and a license plate type of the virtual vehicle license plate, the composite image of the virtual vehicle license plate thereby emulating an actual license plate image and including the set of license plate characters, the license plate issuing authority, and the license plate type; and
extracting the vehicle license plate fingerprint data from the corresponding composite image of the virtual vehicle license plate to generate the respective entry;
receiving roadside data including at least a roadside image of a first vehicle license plate;
querying the database based on the roadside data;
comparing at least a portion of the entries to the roadside data, including comparing the roadside image of the first vehicle license plate and at least the corresponding virtual vehicle license plate; and
generating a confidence factor based in part on a level of similarity between at least one individual entry of the portion of the entries and the roadside data.

14. The method according to claim 13, wherein comparing the roadside image of the first vehicle license plate and the vehicle license plate fingerprint data further includes comparing the vehicle license plate fingerprint data and the roadside image of the first vehicle license plate so as to recognize at least one of a first series of characters of the first vehicle license plate.

15. The method according to claim 13, wherein comparing the portion of the entries to the roadside data includes comparing the roadside vehicle characteristic metadata and at least the corresponding vehicle characteristic metadata.

16. The method according to claim 13, the method further comprising comparing the confidence factor to a confidence threshold; and
generating a new entry based at least in part on the roadside data and responsive to determining that the confidence factor is greater than the confidence threshold.

17. The method according to claim 13, wherein querying the database further includes querying one or more cloud compute database instances provisioned among one or more cloud database providers.

18. The method according to claim 13, wherein dynamically generating a composite image of a virtual license plate includes randomly selecting a plurality of license plate characters from a set of license plate characters, an issuing authority from a plurality of issuing authorities, and a license plate type from a plurality of license plate types.

19. The method according to claim 13, further comprising:
partitioning the roadside image of the first vehicle license plate into a plurality of segments including a plurality of characters of the first vehicle license plate;
assigning each of the plurality of segments to one or more crowd source analysis providers configured to recognize each of the plurality of characters;
receiving and combining the recognition of each character to provide a reconstruction of the plurality of characters of the first vehicle license plate; and
matching the first vehicle license plate with the virtual vehicle license plate based on the reconstruction of the plurality of characters.

20. The method according to claim 13, wherein the composite image of the virtual vehicle license plate consists of the set of license plate characters, the license plate issuing authority, and the license plate type of the virtual vehicle license plate.

* * * * *